(12) United States Patent
Pan et al.

(10) Patent No.: US 11,457,355 B2
(45) Date of Patent: Sep. 27, 2022

(54) METHOD AND APPARATUS FOR SUPPORTING VEHICLE-TO-EVERYTHING (V2X) SERVICES ON SINGLE ONE-TO-ONE SIDELINK COMMUNICATION LINK IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 186 days.

(21) Appl. No.: 16/731,729

(22) Filed: Dec. 31, 2019

(65) Prior Publication Data

US 2020/0221298 A1 Jul. 9, 2020

Related U.S. Application Data

(60) Provisional application No. 62/788,450, filed on Jan. 4, 2019.

(51) Int. Cl.
*H04B 7/00* (2006.01)
*H04W 12/0471* (2021.01)
(Continued)

(52) U.S. Cl.
CPC ......... *H04W 12/0471* (2021.01); *H04W 4/44* (2018.02); *H04W 4/80* (2018.02)

(58) Field of Classification Search
CPC ...... H04W 4/44; H04W 4/80; H04W 12/0471
(Continued)

(56) References Cited

U.S. PATENT DOCUMENTS

2018/0069618 A1* 3/2018 Loehr ............... H04W 72/1263
2018/0255499 A1* 9/2018 Loehr .................. H04W 76/23
(Continued)

FOREIGN PATENT DOCUMENTS

WO 2018128505 7/2018

OTHER PUBLICATIONS

"3rd Generation Partnership Project; Technical Specification Group Services and System Aspects; Study on security issues to support Proximity Services (ProSe) (Release 14)", 3GPP Draft; 33833-200, 3rd Generation Partnership Project (3GPP), Mobile Competence Centre ; 650, Route Des Lucioles ; F-06921 Sophia-Antipolis Cedex ; France Dec. 6, 2016 (Dec. 6, 2016), XP051187229.
(Continued)

*Primary Examiner* — April G Gonzales
(74) *Attorney, Agent, or Firm* — Skaar Ulbrich Macari, P.A.

(57) ABSTRACT

A method and apparatus are disclosed from the perspective of a first UE (User Equipment) to support multiple services on a one-to-one sidelink communication link between the first UE and a second UE. In one embodiment, the first UE initiates a first service. The first UE also establishes the one-to-one sidelink communication link for the first service. Furthermore, the first UE negotiates a security configuration with the second UE for encrypting or decrypting data from the first service. In addition, the first UE initiates a second service. The first UE also encrypts or decrypts data from the second service with the security configuration used by the first service.

19 Claims, 22 Drawing Sheets

(51) Int. Cl.
  *H04W 4/44* (2018.01)
  *H04W 4/80* (2018.01)
(58) Field of Classification Search
  USPC .......................................................... 713/171
  See application file for complete search history.

(56) References Cited

U.S. PATENT DOCUMENTS

2019/0223008 A1* 7/2019 Vanderveen .......... H04L 9/0825
2019/0363843 A1* 11/2019 Gordaychik .......... H04W 52/58
2020/0100088 A1* 3/2020 Kim ...................... H04W 48/16

OTHER PUBLICATIONS

"3rd Generation Partnership Project; Technical Specification Group Services and System Aspects; Study on architecture enhancements for LTE support of V2X services (Release 14)", 650, Route Des Lucioles ; F-06921 Sophia-Antipolis Cedex ; France, vol. SA WG2, No. V0.3.0,Apr. 19, 2016 (Apr. 19, 2016), pp. 1-37, XP051088569.
Samsung: "Various updates to 36579-1", 3GPP Draft; R5-180638 Various Updates To 36579-1-100, 3rd Generation Partnership Project (3GPP), Mobile Competence Centre ; 650, Route Des Lucioles ; F-06921 Sophia-Antipolis Cedex ; France vol. RAN WG5, No. Athens, Greece; Feb. 26, 2018-Mar. 2, 2018 Feb. 16, 2018 (Feb. 16, 2018), XP051404622.
"3rd Generation Partnership Project; Technical Specification Group Services and System Aspects; Proximity-based Services (ProSe); Security aspects (Release 15)", 650, Route Des Lucioles ; F-06921 Sophia-Antipolis Cedex ; France, vol. SA WG3, No. V15.0.0, Jun. 22, 2018 (Jun. 22, 2018), pp. 1-90,XP051473871.
European Search Report in corresponding EP Application No. 19220167.1, dated Jun. 4, 2020.
Notice of Submission of Opinion from Korean Intellectual Property Office in corresponding KR Application No. 10-2019-0178782, dated Feb. 23, 2021.
3GPP TS 24.334 V15.2.0 (Sep. 2018), 3rd Generation Partnership Project; Technical Specification Group Core Network and Terminals; Proximity-Services (ProSe) User Equipment (UE) to ProSe function protocol aspects; Stage 3 (Release 15). 650 Route des Lucioles-Sophia Antipolis, Valbonne—France.
3GPP TR 23.786 V0.9.0 (Oct. 2018), 3rd Generation Partnership Project; Technical Specification Group Services and System Aspects; Study on architecture enhancements for EPS and 5G System to support advanced V2X services (Release 16). 650 Route des Lucioles-Sophia Antipolis, Valbonne—France.

* cited by examiner

| IEI | Information Element | Type/Reference | Presence | Format | Length |
|---|---|---|---|---|---|
| | DIRECT_COMMUNICATION _REQUEST message identity | PC5-SP Message Type 12.5.1.1. | M | V | 1 |
| | Sequence Number | Sequence Number 12.5.1.2 | M | V | 2 |
| | User Info | User Info 12.5.1.3 | M | LV | 3-253 |
| | IP Address Config | IP Address Config 12.5.1.4 | M | V | 1 |
| | Maximum Inactivity Period | Maximum Inactivity Period 12.5.1.9 | M | V | 4 |
| | Nonce_1 | Nonce_1 12.5.1.30 | M | V | 16 |
| | UE Security Capabilities | UE Security Capabilities 12.5.1.22 | M | V | 2 |
| | MSB of $K_{D\text{-sess}}$ ID | MSB of $K_{D\text{-sess}}$ ID 12.5.1.25 | M | V | 1 |
| 17 | $K_D$ ID | $K_D$ ID 12.5.1.30 | O | TV | 5 |
| 25 | Relay Service Code | Relay Service Code 12.5.1.17 | O | TV | 4 |
| 22 | Signature | Signature 12.5.1.33 | O | TV | 130 |
| 3 | Link Local IPv6 Address | IPv6 Address 12.5.1.5 | O | TV | 17 |

FIG. 9 (PRIOR ART)

| IEI | Information Element | Type/Reference | Presence | Format | Length |
|---|---|---|---|---|---|
| | DIRECT_COMMUNICATION _ACCEPT message identity | PC5-SP Message Type 12.5.1.1. | M | V | 1 |
| | Sequence Number | Sequence Number 12.5.1.2 | M | V | 2 |
| | IP Address Config | IP Address Config 12.5.1.4 | M | V | 1 |
| 3 | Link Local IPv6 Address | Link Local IPv6 Address 12.5.1.5 | O | TV | 17 |

FIG. 10 (PRIOR ART)

| IEI | Information Element | Type/Reference | Presence | Format | Length |
|---|---|---|---|---|---|
|  | DIRECT_SECURITY MODE COMMAND message identity | PC5-SP Message Type 12.5.1.1. | M | V | 1 |
|  | Sequence Number | Sequence Number 12.5.1.2 | M | V | 2 |
|  | UE Security Capabilities | UE Security Capabilities 12.5.1.22 | M | V | 2 |
|  | Nonce 2 | Nonce 2 12.5.1.31 | M | V | 16 |
|  | Chosen Algorithms | Chosen Algorithms 12.5.1.23 | M | V | 1 |
|  | LSB of $K_{D\text{-}sess}$ ID | LSB of $K_{D\text{-}sess}$ 12.5.1.24 | M | V | 1 |
| 16 | MSB of $K_D$ ID | MSB of $K_D$ ID 12.5.1.27 | O | TV | 3 |
| 18 | $K_D$ Freshness | $K_D$ Freshness 12.5.1.30 | O | TV | 17 |
| 24 | GPI | GPI 12.5.1.18 | O | TLV | Variable |
| 1 | User Info | User Info 12.5.1.3 | O | TLV | 3-253 |
| 22 | Signature | Signature 12.5.1.33 | O | TV | 130 |
| 23 | Encrypted Payload | Encrypted Payload 12.5.1.34 | O | TLV | Variable |

FIG. 11 (PRIOR ART)

| IEI | Information Element | Type/Reference | Presence | Format | Length |
|---|---|---|---|---|---|
| | DIRECT_SECURITY MODE COMPLETE message identity | PC5-SP Message Type 12.5.1.1. | M | V | 1 |
| | Sequence Number | Sequence Number 12.5.1.2 | M | V | 2 |
| 15 | LSB of $K_D$ ID | LSB of $K_D$ ID 12.5.1.26 | O | TV | 3 |

FIG. 12 (PRIOR ART)

| 8 | 7 | 6 | 5 | 4 | 3 | 2 | 1 | |
|---|---|---|---|---|---|---|---|---|
| IP Address Config IEI ||||||||octet 1 |
| IP address Config Content ||||||||octet 2 |

FIG. 13 (PRIOR ART)

```
IP Address Config value (octet 2)
Bits
4 3 2 1
0 0 0 0    DHCPv4 Server
0 0 0 1    IPv6 Router
0 0 1 0    DHCPv4 Server & IPv6 Router
0 0 1 1    address allocation not supported All other values are reserved.

Bit 5 to 8 of octet 2 are spare and shall be coded as zero.
```

FIG. 14 (PRIOR ART)

IP address value (octet 2 to 17)

This contains the 128-bit IPv6 address. This IPv6 address is encoded as a 128-bit address according to IETF RFC 4291 [36].

METHOD AND APPARATUS FOR SUPPORTING VEHICLE-TO-EVERYTHING (V2X) SERVICES ON SINGLE ONE-TO-ONE SIDELINK COMMUNICATION LINK IN A WIRELESS COMMUNICATION SYSTEM

CROSS-REFERENCE TO RELATED APPLICATIONS

The present application claims the benefit of U.S. Provisional Patent Application Ser. No. 62/788,450 filed on Jan. 4, 2019, the entire disclosure of which is incorporated herein in its entirety by reference.

FIELD

This disclosure generally relates to wireless communication networks, and more particularly, to a method and apparatus for supporting Vehicle-to-Everything (V2X) services on a single one-to-one sidelink communication link in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment) to support multiple services on a one-to-one sidelink communication link between the first UE and a second UE. In one embodiment, the first UE initiates a first service. The first UE also establishes the one-to-one sidelink communication link for the first service. Furthermore, the first UE negotiates a security configuration with the second UE for encrypting or decrypting data from the first service. In addition, the first UE initiates a second service. The first UE also encrypts or decrypts data from the second service with the security configuration used by the first service.

BRIEF DESCRIPTION OF THE DRAWINGS

FIG. 9 is a reproduction of Table 11.4.2.1.1 of 3GPP TR 24.334 V15.2.0.

FIG. 10 is a reproduction of Table 11.4.3.1.1 of 3GPP TR 24.334 V15.2.0.

FIG. 11 is a reproduction of Table 11.4.12A.1.1 of 3GPP TR 24.334 V15.2.0.

FIG. 12 is a reproduction of Table 11.4.13.1 of 3GPP TR 24.334 V15.2.0.

FIG. 13 is a reproduction of FIG. 12.5.1.4.1 of 3GPP TR 24.334 V15.2.0.

FIG. 14 is a reproduction of Table 12.5.1.4.1 of 3GPP TR 24.334 V15.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including:

TS 24.386 V15.1.0, "User Equipment (UE) to V2X control function; protocol aspects"; 3GPP RAN1 #94 Chairman's Note; TR 23.786 V1.0.0, "Study on architecture enhancements for EPS and 5G System to support advanced V2X services"; TS 23.303 V15.1.0, "Proximity-based services (ProSe); Stage 2"; TR 22.886 V15.0.0, "Study on enhancement of 3GPP Support for 5G V2X Services"; R2-1812975, "LS on Prioritised Use Cases and Requirements for consideration in Rel-16 NR-V2X"; R2-1815440, "Basic Scenarios and Overal Steps for NR Sidelink design", LG Electronics Inc.; TS 24.334 V15.2.0, "User Equipment (UE) to V2X control function; protocol aspects; Stage 3"; and TS 33.303 V15.0.0, "Proximity-based services (ProSe); Security aspects". The standards and documents listed above are hereby expressly incorporated by reference in their entirety.

Figure 1:
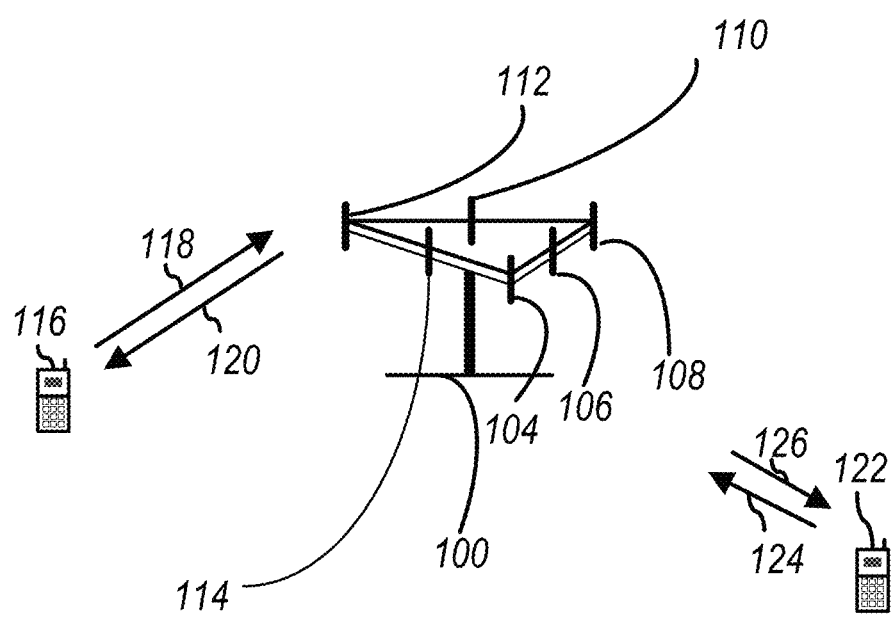
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
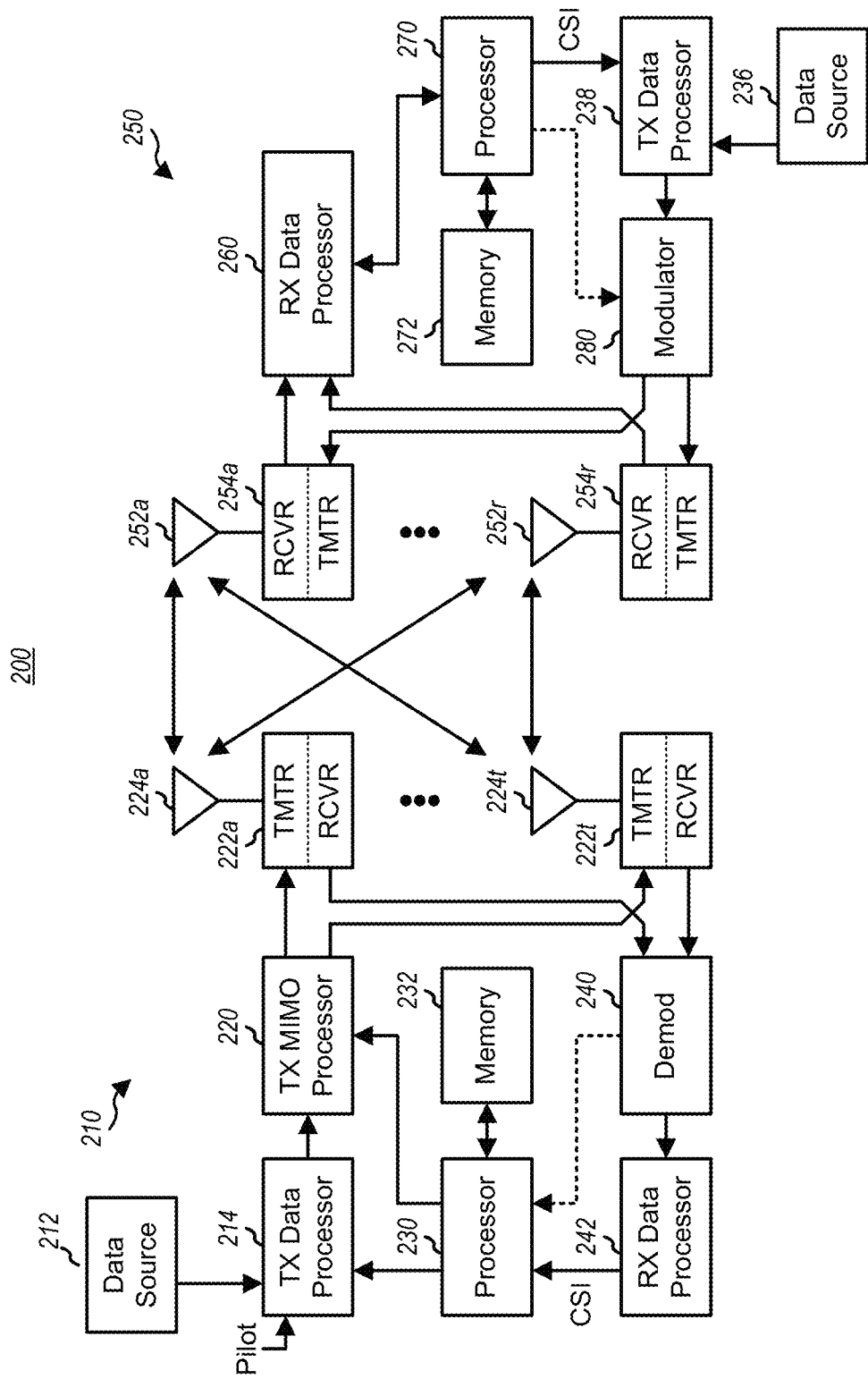
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
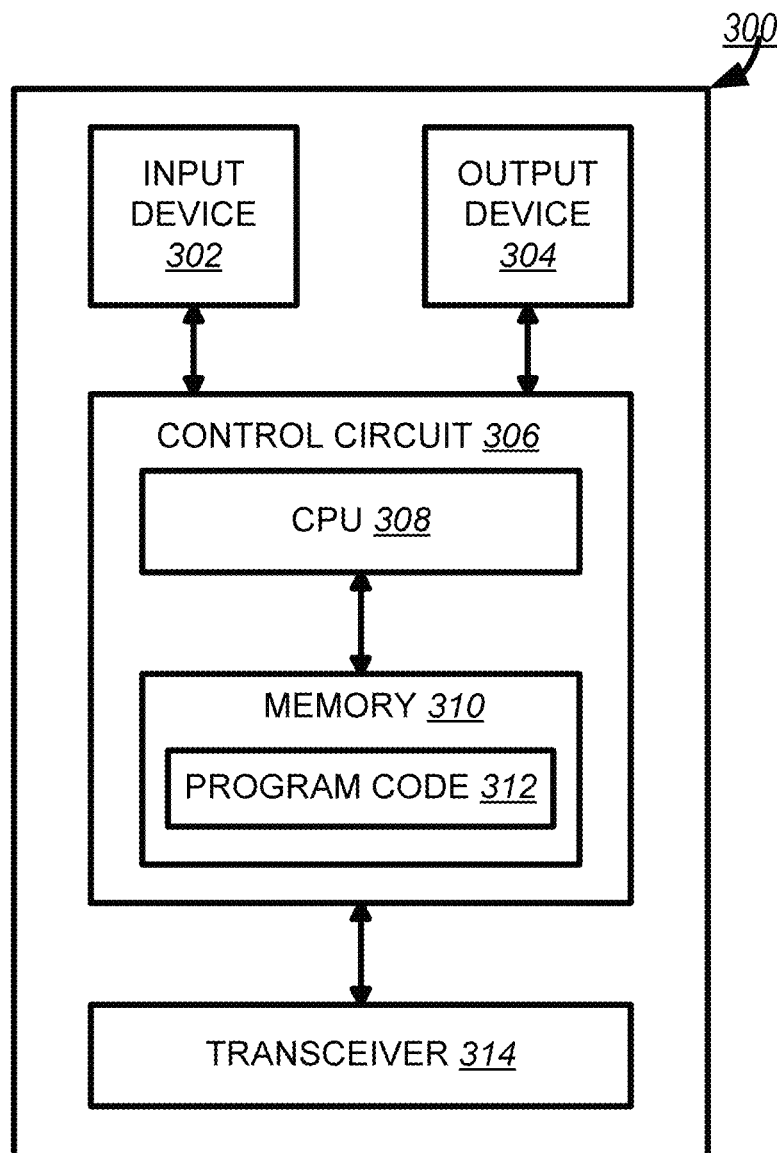
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
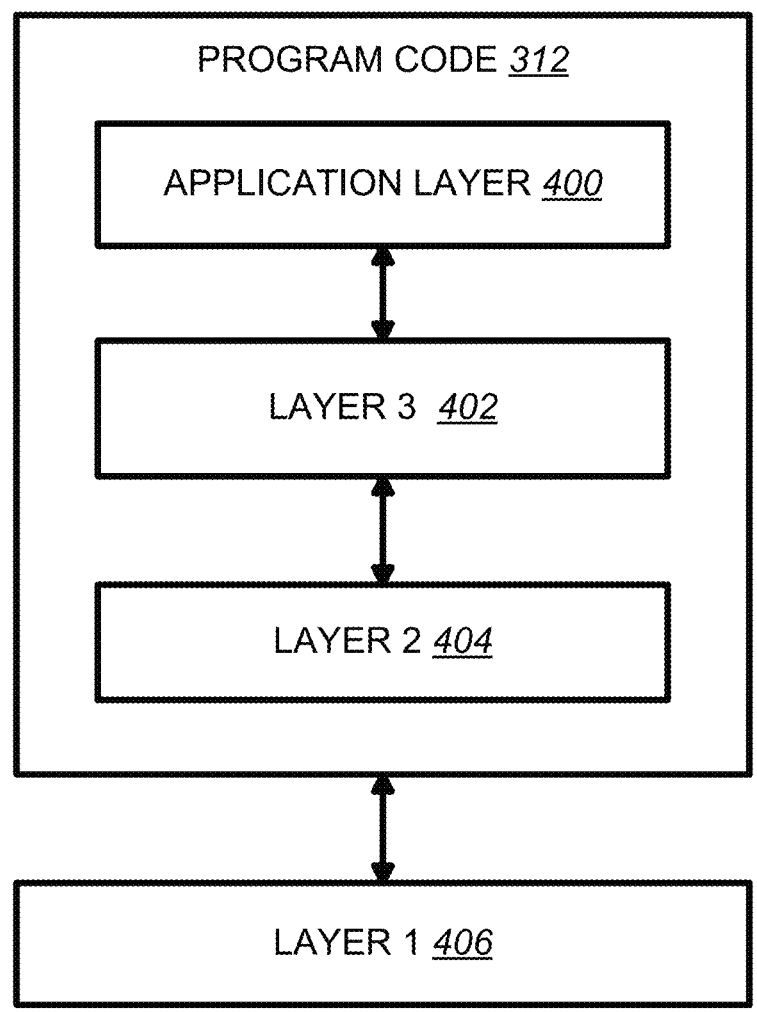
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
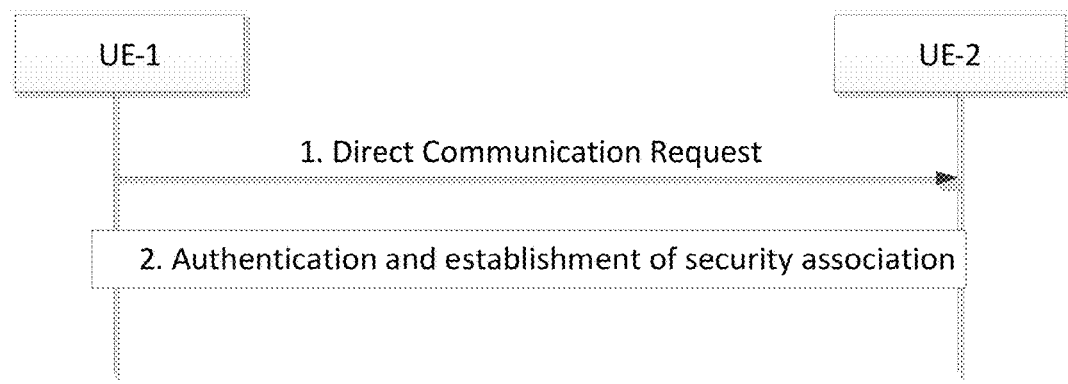
FIG. 5 is a reproduction of FIG. 5.4.5.2-1 of 3GPP TS 23.303 V15.1.0.

Section 5.4.4.23 of 3GPP TS 23.303 states:
5.4.5.2 Establishment of Secure Layer-2 Link Over PC5
Depicted in FIG. 5.4.5.2-1 is the procedure for establishment of secure layer-2 link over PC5.
UEs engaged in isolated (non-relay) one to one communication negotiate IP address allocation mechanisms and optionally exchange link-local IPv6 addresses if needed during the link establishment procedure.
[FIG. 5.4.5.2-1 of 3GPP TS 23.303 V15.1.0, entitled "Establishment of secure layer-2 link over PC5", is reproduced as FIG. 5]
  1. UE-1 sends a Direct Communication Request message to UE-2 in order to trigger mutual authentication. This message includes the User Info.
    If the link is setup for isolated one-to-one communication (none of the UEs is a relay), UE-1 shall indicate in the message whether it can act as a DHCPv4 server, IPv6 router, or both. If UE-1 does not support any of the IP address allocation mechanisms, it shall include a link-local IPv6 address in the message.
  NOTE 1: The link initiator (UE-1) needs to know the Layer-2 ID of the peer (UE-2) in order to perform step 1. As an example, the link initiator can learn the Layer-2 ID of the peer by executing a discovery procedure first or by having participated in one-to-many ProSe Direct Communication including the peer.
  2. UE-2 initiates the procedure for mutual authentication. The successful completion of the authentication procedure completes the establishment of the secure layer-2 link over PC5. As part of this step, UE-2 includes the User Info in a response to UE-1.
    If the link is setup for isolated one-to-one communication (none of the UEs is a relay), UE-2 shall indicate to UE-1 in the response message whether it can act as a DHCPv4 server, IPv6 router, or both. If UE-2 does not support any of the IP address allocation mechanisms and UE-1 included a link-local IPv6 address in step 1, UE-2 shall include a non-conflicting link-local IPv6 address in the response message.
    If both UE-1 and UE-2 selected to use link-local IPv6 address, they shall disable the duplicate address detection defined in RFC 4862 [6].
  NOTE 2: When either UE-1 or UE-2 indicates the support of DHCPv4 or IPv6 router, corresponding address configuration procedure would be carried out after the establishment of the layer 2 link, and the link-local IPv6 addresses are ignored.
  NOTE 3: In order to use link-local IPv6 addresses the applications using isolated one-to-one ProSe Direct Communication use application layer identifiers that are compatible with Multicast DNS as specified in RFC 6762 [34]. In order to make use of the mDNS, the upper layer need to be aware of the use of link-local address over the L2 link, as the FQDN used for it would be different.

3GPP TR 23.786 states:
6.11 Solution #11: Solution for Unicast or Multicast for eV2X Communication Over PC5 Reference Point
6.11.1 Functional Description
This solution addresses Key Issue #1 on the support of eV2X Group Communication, Key Issue #9 on the support of the unicast/multicast communication over PC5 and Key Issue #4 on the support of PC5 QoS framework enhancement for eV2X, focusing on the following aspects:
  Identifiers for the unicast communication, e.g. L2 ID;
  Signalling protocol to support unicast/multicast communication;
  QoS support and AS layer configurations;
  Security associations;
  Procedures for the link establishment and maintenance.
6.11.2 Solution Description
[ . . . ]
6.11.2.2 Signalling Protocol to Support Unicast/Multicast Communication
For unicast or multicast communication, there is a need for some control message exchanged between the UEs involved in order to establish the link or group. Therefore, some signalling protocol is required.
In ProSe one-to-one communication defined in TS 23.303 [8], a PC5 Signalling Protocol (clause 5.1.1.5.2) was introduced, which runs over PDCP layer. Although it is defined for ProSe use, the messages could be extended in order to be used for V2X communication. The detailed protocol design needs to be reviewed based on the actual unicast operation procedures.

Another alternative approach is to run RRC over PC5. As PC5 Signalling Protocol is used over PDCP anyway, RRC protocol can be used to replace it. Although not all RRC features are required for PC5 operation, those selected V2X relevant RRC messages can be extended and used, e.g. SidelinkUEInformation, etc. The advantage of that is the potential unification of control signalling protocols for Uu and PC5.
Therefore, in this solution a signalling protocol over PC5 for the unicast/multicast communication management is introduced.
[ . . . ]
6.11.2.4 Security Associations
The unicast or multicast communication may need protection at link layer as well. The ProSe one-to-one communication supports secure L2 link establishment, as defined in TS 33.303 [11].

However, within V2X communication context, each UE has the corresponding certificates for the security protection. Therefore, there may be a need to enhancement or adjust the existing L2 secure link establishment protocol in order to support the use of such security associations.

The exact security handling should be analysed and decided by SA3. SA2 design needs to be aligned with those decisions when available.

6.11.2.5 Procedures for the Link Establishment and Maintenance

TS 23.303 [8] has defined the procedures for the establishment and maintenance of secure L2 link over PC5, as in clause 5.4.5. These procedures can be enhanced and adapted for the V2X use, subject to the decisions above regarding signalling protocol choice, security handling, etc.

Some addition considerations for the V2X for the link/group handling is required though. For V2X communication, not all UEs will be supporting or use unicast communication. In addition, not all services may be run over the same channel or RAT (e.g. LTE V2X vs. NR V2X). With V2X, there is no discovery channel like that of ProSe (i.e. PC5-D), and there is no assumption on the configuration from network as that of Public Safety use. Therefore, in order to support the link establishment, there is a need for service announcement in order to inform the peer of the existence of the UE and the capability of the UE for the unicast communication, e.g. channel to operate, or the services supported, etc.

Such a service announcement should be made accessible to all the UEs that are interested in using the service. For example, such announcement could be either configured to send over a dedicate channel, similar to how WAVE Service Advertisement (WSA) is handled, or to be piggybacked on the periodical messages from the supporting UEs.

NOTE 1: Service announcement is handled by upper layer and out of scope of SA2.

For layer 2 link maintenance, keep-alive functionality is needed to detect that when the UEs are not in direct communication range, so that they can proceed with implicit layer 2 link release.

NOTE 2: It is left to Stage 3 to determine how keep-alive functionality is supported.

6.11.3 Procedures 6.11.3.1 Establishment of Layer 2 Link Over PC5

Layer-2 link establishment procedure as defined in TS 23.303 [8] clause 5.4.5.2 can be reused for the eV2X unicast link establishment, with the following adaptations:

The messages may be converted to RRC signaling message instead of PC5 signaling message, depends on RAN WG's decision.

"UE oriented layer 2 link establishment" operates as below and FIG. 6.11.3.1-1 shows the procedure:

The Direct Communication Request message can be sent by UE-1 with broadcast mechanism, i.e. to a broadcast address associated with the application instead of the L2 ID of UE-2. The upper identifier of UE-2 is included in the Direct Communication Request message to allow UE-2 to decide on if to respond to the request. The Source L2 ID of this message should be the unicast L2 ID of the UE-1.

The Direct Communication Request message should be transmitted using default AS layer setting e.g. broadcast setting, that can be understood by UE-2.

UE-2 uses the source L2 ID of the received Direct Communication Request message as destination L2 ID in the subsequent signalling to UE-1, and uses its own unicast L2 ID as the source L2 ID. UE-1 obtains UE-2's L2 ID for future communication, for signalling and data traffic.

Figure 6:
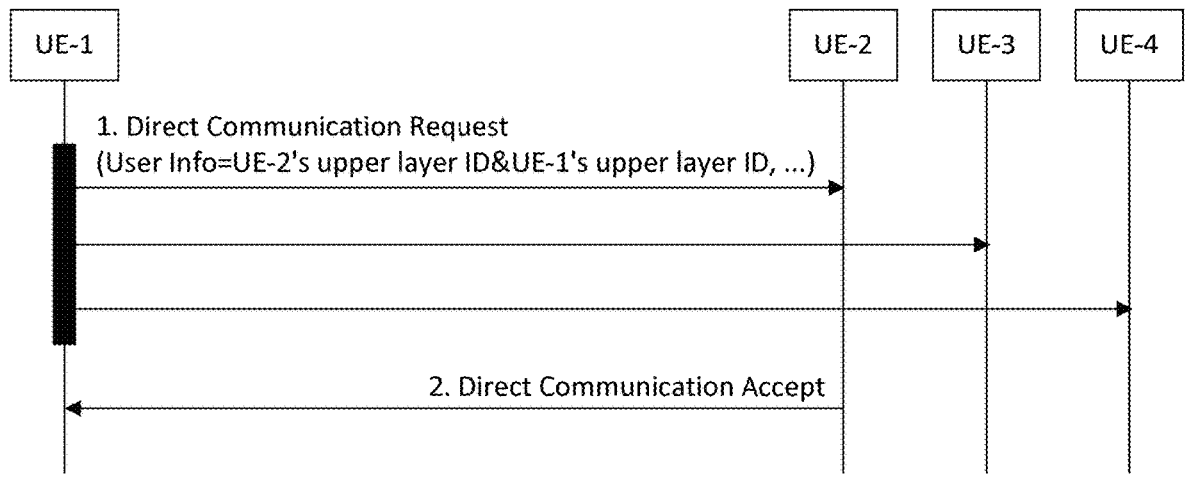
FIG. 6 is a reproduction of FIG. 6.11.3.1-1 of 3GPP TR 23.786 V1.0.0.

[FIG. 6.11.3.1-1 of 3GPP TR 23.786 V1.0.0, entitled "UE oriented layer 2 link establishment procedure", is reproduced as FIG. 6]

"V2X Service oriented layer 2 link establishment" operates same to the "UE oriented layer 2 link establishment" with the following differences and FIG. 6.11.3.1-2 shows the procedure:

The information about V2X Service requesting L2 link establishment, i.e. information about the announced V2X Service is included in the Direct Communication Request message to allow other UEs to decide on if to respond to the request.

The UEs that are interested in using the V2X Service announced by the Direct Communication Request message can respond to the request (UE-2 and UE-4 in FIG. 6.11.3.1-2).

After establishing layer 2 link with other UE(s) as described above, new UE(s) can enter proximity with UE-1, i.e. UE-1's direct communication range. In this case, UE-1 may initiate V2X Service oriented layer 2 link establishment procedure as it is aware of new UE(s) from Application Layer messages sent by the UE(s). Or the new UE may initiate V2X Service oriented layer 2 link establishment procedure. Therefore, UE-1 does not have to keep sending a Direct Communication Request message periodically to announce the V2X Service it wants to establish L2 link with other UE for unicast.

Figure 7:
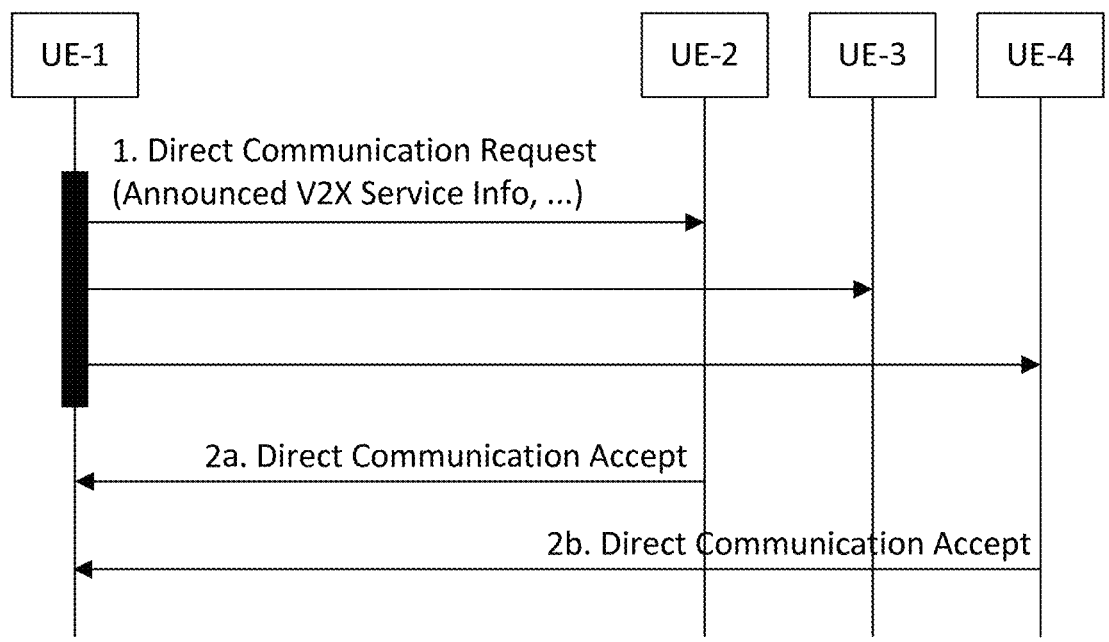
FIG. 7 is a reproduction of FIG. 6.11.3.1-2 of 3GPP TR 23.786 V1.0.0.

[FIG. 6.11.3.1-2 of 3GPP TR 23.786 V1.0.0, entitled "V2X Service oriented layer 2 link establishment procedure", is reproduced as FIG. 7]

The layer 2 link supports the non-IP traffic. No IP address negotiation and allocation procedure would be carried out.

6.11.3.2 Contents of the Signalling Message for Link Establishment

The information carried in Direct Communication Request message defined in TS 24.334 [13] requires at least the following updates:

For "UE oriented layer 2 link establishment",

The User Info needs to include the target UE's ID (UE-2's upper layer ID), besides the initiating UE's ID (UE-Vs upper layer ID).

NOTE: Stage 3 can decide if these IDs can be carried in the same IE or separate IEs, for example, the Station ID/Vehicle Temp ID only needs to be 4 octets.

For "V2X Service oriented layer 2 link establishment",

The Announced V2X Service Info needs to include the information about V2X Service requesting L2 link establishment, e.g. PSID or ITS-AIDS of the V2X application. Sensor Sharing, and etc can be the case for the V2X Service.

The IP Address Config, which is specified as mandatory for ProSe, should allow an indication that no IP is to be used, such that the receiving UE (e.g. UE-2) would not start any IP configuration procedure for this particular link.

The IEs dedicated for security need to be reviewed by SA3, as the security mechanism for eV2X may be different and requires different IEs.

Additional configuraiton information regarding the link, e.g. when RRC message is used there may be AS layer configurations.

[ . . . ]

6.11.3.4 Security Aspects for Layer 2 Link

As the eV2X applications have associated security certificates, the unicast link can reuse those to derive the security association for protecting the signalling or data of the unicast link.

[ . . . ]

3GPP TS 24.334 states:

10.4.2 Direct Link Setup Procedure 10.4.2.1 General

The direct link setup procedure is used to establish a secure direct link between two ProSe-enabled UEs. The UE sending the request message is called the "initiating UE" and the other UE is called the "target UE".

If the direct link setup is for isolated one-to-one ProSe direct communication, i.e. when none of the two UEs is a ProSe UE-to-network relay, both UEs are required to have fetched in advance the public key of the KMS (Key Management Server), and a set of credentials associated with the UE's identity (as defined in IETF RFC 6507 [39] and IETF RFC 6508 [40]), as specified by 3GPP TS 33.303 [6].

10.4.2.2 Direct Link Setup Procedure Initiation by Initiating UE

The initiating UE shall meet the following pre-conditions before initiating this procedure:

- a request from upper layers to establish a direct link with the target UE is received and there is no existing link between the initiating UE and that target UE;
- the link layer identifier for the initiating UE (i.e., Layer 2 ID used for unicast communication) is available (e.g., pre-configured or self-assigned);
- the link layer identifier for the target UE (i.e., Layer 2 ID used for unicast communication) is available to the initiating UE (e.g., pre-configured or obtained via ProSe direct discovery); and
- the initiating UE is either authorised for ProSe direct communication in the serving PLMN, or has a valid authorization for ProSe direct communication when not served by E-UTRAN.

The initiating UE initiates the direct link setup procedure by generating a DIRECT_COMMUNICATION_REQUEST message with:

- the User Info set to:
  - the initiating UE's User Info received from upper layers if the target UE is not a ProSe UE-to-network relay UE;
  - the PRUK ID received from the PKMF if the target UE is a ProSe UE-to-network relay UE, the initiating UE has received a PRUK from the PKMF for this relay, and an attempt to connect to this relay has not been rejected due to the PRUK ID not being recognised;
  - the initiating UE's IMSI if the target UE is a ProSe UE-to-network relay UE and the initiating UE has not received a PRUK from the PKMF for this relay; or
  - the initiating UE's IMSI if the target UE is a ProSe UE-to-network relay UE and the initiating UE has received a PRUK from the PKMF for this relay but an attempt to connect to this relay has been rejected due to the PRUK ID not being recognised;
- an IP Address Config IE set to one of the following values:
  - "DHCPv4 Server" if only IPv4 address allocation mechanism is supported by the initiating UE, i.e., acting as a DHCPv4 Server;
  - "IPv6 Router" if only IPv6 address allocation mechanism is supported by the initiating UE, i.e., acting as an IPv6 Router;
  - "DHCPv4 Server & IPv6 Router" if both IPv4 and IPv6 address allocation mechanisms are supported by the initiating UE; or
  - "address allocation not supported" if neither IPv4 nor IPv6 address allocation mechanism is supported by the initiating UE;
- a Link Local IPv6 Address IE formed locally based on IETF RFC 4862 [15] if the IP Address Config IE is set to "address allocation not supported" and the link is setup for isolated one-to-one communication;
- NOTE 1: the UE can reuse a Link Local IPv6 IP address for multiple isolated one-to-one communication links.
- a Maximum Inactivity Period IE to indicate the maximum inactivity period of the requesting UE over this direct link;
- NOTE 2: The value of Maximum Inactivity Period IE can be calculated based on UE's local settings, such as keepalive timer T4102 (see 10.4.3), retransmission timer T4101 (see 10.4.3), and maximum number of allowed retransmissions for DIRECT_COMMUNICATION_KEEPALIVE message.
- a Nonce_1 IE set to the 128-bit nonce value generated by the initiating UE for the purpose of session key establishment over this direct link;
- a UE Security Capabilities IE set to indicate the list of algorithms that the initiating UE supports for the security establishment of this direct link;
- an MSB of $K_{D\text{-}sess}$ ID IE set to the most significant 8 bits of the $K_{D\text{-}sess}$ ID; and
- Optionally, a $K_D$ ID IE set to the known ID of $K_D$ which was previously established if the initiating UE has an existing $K_D$ with the target UE.

If the direct link setup is for isolated one-to-one ProSe direct communication, the DIRECT_COMMUNICATION_REQUEST message shall also include the following parameters:

- the Signature IE set to the ECCSI signature calculated with the following information elements, as specified in 3GPP TS 33.303 [6]:
  - User Info; and
  - Nonce_1.

Else if the link setup for remote UE to ProSe UE-to-network relay ProSe direct communication, the DIRECT_COMMUNICATION_REQUEST message shall also include the Relay Service Code IE set to the Relay Service Code of the target relay.

After the DIRECT_COMMUNICATION_REQUEST message is generated, the initiating UE shall pass this message to the lower layers for transmission along with the initiating UE's Layer 2 ID (for unicast communication) and the target UE's Layer 2 ID (for unicast communication), and start timer T4100. The UE shall not send a new DIRECT_COMMUNICATION_REQUEST message to the same target UE while timer T4100 is running.

Figure 8:
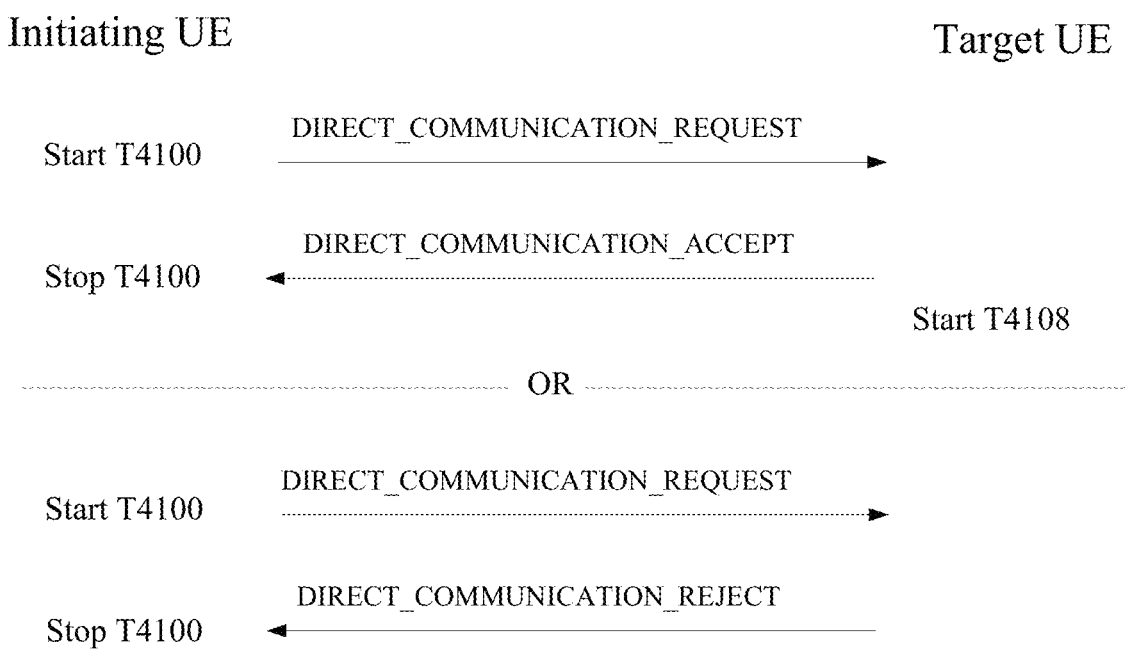
FIG. 8 is a reproduction of FIG. 10.4.2.2.1 of 3GPP TR 24.334 V15.2.0.

[FIG. 10.4.2.2.1 of 3GPP TR 24.334 V15.2.0, entitled "Direct link setup procedure", is reproduced as FIG. 8]

10.4.2.3 Direct Link Setup Procedure Accepted by the Target UE

Upon receiving a DIRECT_COMMUNICATION_REQUEST message, the target UE shall store the pair of Layer 2 IDs (for unicast communication) used in the transport of this message provided by the lower layers and associate them with a direct link context.

The target UE then checks the User Info IE included in the DIRECT_COMMUNICATION_REQUEST message and determines whether this request can be accepted or not. Then, the target UE examines the IP Address Config IE to see whether there is at least one common IP address configuration option supported by both the initiating UE and the target UE. If the above check is successful, the target UE shall invoke the direct security mode control procedure as specified in subclause 10.4.5 to establish a security association between the target UE and the initiating UE. Only after the completion of link authentication procedure and a successful establishment of the security association, the target UE shall send a DIRECT_COMMUNICATION_ACCEPT message to the initiating UE.

The target UE shall include an IP Address Config IE set to one of the following values:
- "DHCPv4 Server" if only IPv4 address allocation mechanism is supported by the target UE and the target UE is able to act as DHCP server;
- "IPv6 Router" if only IPv6 address allocation mechanism is supported by the target UE and the target UE is able to act as IPv6 Router;
- "DHCPv4 Server & IPv6 Router" if both IPv4 and IPv6 address allocation mechanisms are supported by the target UE; or
- "address allocation not supported" if neither IPv4 nor IPv6 address allocation is supported by the target UE.

lithe IP Address Config IE is set to "address allocation not supported" and the received DIRECT_COMMUNICATION_REQUEST message included a Link Local IPv6 Address IE, the target UE shall include a Link Local IPv6 Address IE set to the link-local IPv6 address formed locally.

NOTE: the UE can reuse a Link Local IPv6 IP address for multiple isolated one-to-one communication links.

A ProSe UE-to-network relay UE shall support at least one of the IP address allocation mechanisms.

lithe target UE acts as a ProSe UE-to-network relay UE and PDN connection for relaying associated with the ProSe relay UE ID is not established yet or additional PDN connection used for relaying is needed when the ProSe UE-to-network relay UE sends the DIRECT_COMMUNICATION_ACCEPT message to the remote UE, the ProSe UE-to-network relay UE shall initiate the UE requested PDN connectivity procedure by sending the PDN CONNECTIVITY REQUEST message including the APN which is associated with the ProSe Relay UE ID as specified in 3GPP TS 24.301 [11].

IF the target UE is a ProSe-UE-to-network relay UE, the target UE shall create an inactivity timer T4108 with the value provided in the Maximum Inactivity Period IE included in the DIRECT_COMMUNICATION_REQUEST message, and start the timer T4108 when it has no more messages to send over the link to be established. Once the timer T4108 is started, if any communication activity occurs before the timer T4108 expires, the UE shall stop the timer T4108 and reset it with the initial value, unless a new value is provided in a Maximum Inactivity Period IE in a DIRECT_COMMUNICATION_KEEPALIVE message.

If the target UE is a ProSe-UE-to-network relay UE, and it has been configured by the serving PLMN to report the IMEI or IMEISV of the remote UE(s) served by the relay based on the service authorisation procedure as specified in clause 5, the ProSe UE-to-network relay UE shall initiate a remote UE information request procedure (as specified in subclause 10.7.2) to request the IMEI or IMEISV of the remote UE upon successful direct link establishment.

10.4.2.4 Direct Link Setup Procedure Completion by the Initiating UE

Upon receipt of the DIRECT_COMMUNICATION_ACCEPT message, the initiating UE shall stop timer T4100. From this time onward the initiating UE shall use the established link for all one-to-one communication (including additional PC5 Signalling messages) to the target UE.
[ . . . ]

10.4.6 IP Address Configuration 10.4.6.1 General

The IP address configuration procedure is performed after the establishment of the direct link to enable IP connectivity between the UEs at each end of the direct link.

When the IP address configuration procedure for a remote UE completes, the ProSe UE-to-network relay UE shall perform the Remote UE report procedure as specified in 3GPP TS 24.301 [11].

10.4.6.2 Selection of IP Version

When neither of the two UEs on the direct link acts as a ProSe UE-to-network relay, the two UEs shall select the IP version (IPv4 or IPv6) to be used based on the following rules:
- if the target UE in the direct link setup procedure (see subclause 10.4.2) has indicated "DHCPv4 Server" in the IP Address Config IE, then the initiating UE in the direct link setup procedure (see subclause 10.4.2) shall initiate the IPv4 address configuration with DHCPv4 procedure acting as a DHCP client;
- if the target UE in the direct link setup procedure has indicated "IPv6 Router" in the IP Address Config IE, then the initiating UE in the direct link setup procedure shall initiate the IPv6 address configuration with IPv6 stateless address auto-configuration acting as an IPv6 host;
- if the target UE in the direct link setup procedure has indicated "DHCPv4 Server & IPv6 Router" in the IP Address Config IE, then the initiating UE in the direct link setup procedure shall choose either IP version and initiate the address configuration procedure, acting as a client or host;
- if the target UE in the direct link setup procedure has indicated "address allocation not supported" in the IP Address Config IE and the initiating UE has indicated "DHCPv4 Server", "IPv6 Router" or "DHCPv4 Server & IPv6 Router" in the IP Address Config IE, then the target UE shall:
  a) initiate the IPv4 address configuration with DHCPv4 procedure acting as a DHCP client, if the initiating UE has indicated "DHCPv4 Server";
  b) initiate the IPv6 address configuration with IPv6 stateless address auto-configuration acting as an IPv6 host if the initiating UE has indicated "IPv6 Router"; and
  c) choose either IP version and initiate the corresponding IP address configuration procedure as a client or host, if if the other UE has indicated "DHCPv4 Server & IPv6 Router"; and
- if both of the UEs has indicated "address allocation not supported" in the IP Address Config IE, then the UEs shall use IPv6 link-local addresses formed locally as defined in RFC 4862 [15].

When one of the two UEs on the direct link acts as a ProSe UE-to-network relay, the two UEs shall select the IP version (IPv4 or IPv6) to be used based on the following rules
- if the ProSe UE-to-network relay UE has indicated "DHCPv4 Server" in the IP Address Config IE, the remote UE shall initiate the IPv4 address configuration with DHCPv4 procedure acting as a DHCP client;

if the ProSe UE-to-network relay UE has indicated "IPv6 Router" in the IP Address Config IE, the remote UE shall initiate the IPv6 address configuration with IPv6 stateless address auto-configuration acting as an IPv6 host; and if the ProSe UE-to-network relay UE has indicated "DHCPv4 Server & IPv6 Router" in the IP Address Config IE, the remote UE shall choose the IP version and initiate the corresponding IP address configuration procedure as a client or host. Especially, if the remote UE intends to use the ProSe UE-to-network relay UE for mission critical communication (e.g. MCPTT), the remote UE shall initiate the IPv6 stateless address auto-configuration acting as an IPv6 host.

10.4.6.3 IPv4 Address Configuration with DHCPv4

The IPv4 address configuration with DHCPv4 shall be carried out as follow:

1. The DHCP client sends a DHCPDISCOVER message;
2. The DHCP server sends the DHCPOFFER message with the assigned IPv4 address for the client. The IPv4 address provided shall correspond to a local IPv4 address range configured in the DHCP server;
3. When the DHCP client receives the lease offer, it sends a DHCPREQUEST message containing the received IPv4 address.
4. The DHCP server sends a DHCPACK message to the client UE. This message includes the lease duration and any other configuration information that the client might have requested.
5. On receiving the DHCPACK message, the IPv4 address configuration is completed.

NOTE: The DHCPv4 client may skip the DHCPv4 Discovery phase, and send DHCPv4 Request message in broadcast as the first message in accordance with the DHCPv4 renewal process.

If the direct link is setup for one-to-one communication between a remote UE and a UE-to-network relay UE, after the remote UE releases the IPv4 address using DHCPv4 or the IPv4 address lease time expires, the ProSe UE-to-network relay UE shall wait for a relay implementation specific time before allocating the same IPv4 address to another remote UE.

10.4.6.4 IPv6 Address Configuration with IPv6 Stateless Address Auto-Configuration The IPv6 stateless address auto-configuration protocol procedure shall be carried out as follow:

1. the UE acting as an IP Host shall send a Router Solicitation message in order to solicit a Router Advertisement message as specified in IETF RFC 4862 [15].
2. Upon receiving the Router Solicitation message, the other UE shall send an IPv6 Router Advertisement message as specified in IETF RFC 4862 [15], acting as an advertising interface as specified in IETF RFC 4861 [33]. The Router Advertisement messages shall contain an IPv6 prefix, which is to be combined with the interface identifier to form the IPv6 address.
3. The UE which receives the Router advertisement message retrieves the router's address from the Source IP address field of the message, and formed its own IP address with the prefix and the interface identifier as specified in IETF RFC 4862 [15].

If the direct link is setup for one-to-one communication between a remote UE and a UE-to-network relay, the UE-to-network relay shall obtain the IPv6 prefix assigned to the remote UE via prefix delegation function from the network as defined in 3GPP TS 23.401 [34] before sending the IPv6 prefix to the remote UE. After the remote UE receives the Router Advertisement message, it constructs a full IPv6 address via IPv6 Stateless Address auto-configuration in accordance with IETF RFC 4862 [15]. However, the remote UE shall not use any identifiers defined in TS 23.003 [4] as the basis for generating the interface identifier. For privacy, the remote UE may change the interface identifier used to generate the full IPv6 address, as defined in 3GPP TS 23.221 [35] without involving the network. The remote UE shall use the auto-configured IPv6 address while sending packets in this implicitly created PDN connection. If the direct link is setup for one-to-one communication between a remote UE and a UE-to-network relay and support for mission critical applications and policy control for remote UEs is required, the remote UE shall be assigned a /64 IPv6 Prefix from a shorter IPv6 prefix by the UE-to-network relay.

NOTE: In order to support policy control per remote UE, the assignment of a /64 IPv6 Prefix from a shorter IPv6 prefix by the UE-to-network relay is used. The support of the extended TFT filter format including the TFT packet filter attribute Local Address and Mask, as defined in 3GPP TS 24.008 [30], is needed in the UE-to-network relay and the network.

[ ... ]

11.4.2 DIRECT_COMMUNICATION_REQUEST 11.4.2.1 Message Definition

This message is sent by a UE to another peer UE to establish a direct link. See table 11.4.2.1.1.

Message type: DIRECT_COMMUNICATION_REQUEST

[Table 11.4.2.1.1 of 3GPP TR 24.334 V15.2.0, entitled "DIRECT_COMMUNICATION_REQUEST message content", is reproduced as FIG. 9]

11.4.3 DIRECT_COMMUNICATION_ACCEPT 11.4.3.1 Message Definition

This message is sent by the UE to another peer UE to indicate that the corresponding direct link setup request has been accepted. See table 11.4.3.1.1.

.Message type: DIRECT_COMMUNICATION_ACCEPT

[Table 11.4.3.1.1 of 3GPP TR 24.334 V15.2.0, entitled "DIRECT_COMMUNICATION_ACCEPT message content", is reproduced as FIG. 10]

[ ... ]

11.4.12A DIRECT SECURITY MODE COMMAND 11.4.12A.1 Message Definition

This message is sent by a commanding UE to a peer UE to establish the security for a direct link. See table 11.4.12A.1.1.

Message type: DIRECT SECURITY MODE COMMAND

[Table 11.4.12A.1.1 of 3GPP TR 24.334 V15.2.0, entitled "DIRECT_SECURITY_MODE_COMMAND message content", is reproduced as FIG. 11]

11.4.13 DIRECT_SECURITY_MODE_COMPLETE 11.4.13.1 Message Definition

This message is sent by a peer UE to a commanding UE to confirm the establishment of the security for a direct link. See table 11.4.13.1.

Message type: DIRECT_SECURITY_MODE_COMPLETE

[Table 11.4.13.1 of 3GPP TR 24.334 V15.2.0, entitled "DIRECT_SECURITY_MODE_COMPLETE message content", is reproduced as FIG. 12]

[ ... ]

12.5.1.4 IP Address Config

The purpose of the IP Address Config information element is to indicate the configuration options for IP address used by the UE over this direct link.

The IP Address Config is a type 3 information element. The IEI of the IP Address Config IE is 2.

The IP Address Config information element is coded as shown in FIG. 12.5.1.4.1 and table 12.5.1.4.1.

[FIG. 12.5.1.4.1 of 3GPP TR 24.334 V15.2.0, entitled "IP Address Config information element", is reproduced as FIG. 13]

[Table 12.5.1.4.1 of 3GPP TR 24.334 V15.2.0, entitled "IP Address Config information element", is reproduced as FIG. 14]

12.5.1.5 Link Local IPv6 Address

The Link Local IPv6 Address information element contains a link-local IPv6 address.

The Link Local IPv6 Address is a type 3 information element. The IEI of the Link Local IPv6 Address IE is 3.

The Link Local IPv6 Address element is coded as shown in FIG. 12.5.1.5.1 and table 12.5.1.5.1.

Figures 15, 16:
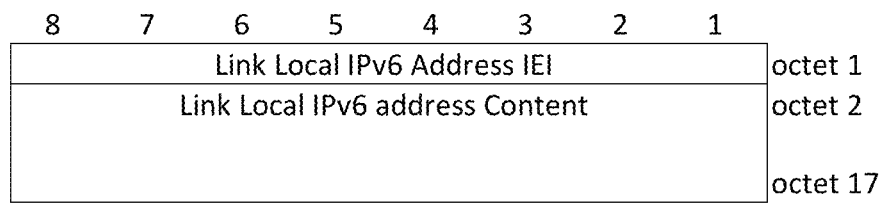
FIG. 15 is a reproduction of FIG. 12.5.1.5.1 of 3GPP TR 24.334 V15.2.0.
FIG. 16 is a reproduction of Table 12.5.1.5.1 of 3GPP TR 24.334 V15.2.0.

[FIG. 12.5.1.5.1 of 3GPP TR 24.334 V15.2.0, entitled "IP Address Config information element", is reproduced as FIG. 15]

[Table 12.5.1.5.1 of 3GPP TR 24.334 V15.2.0, entitled "IPv6 Address information element", is reproduced as FIG. 16]

3GPP Ts 33.303 States:

6.5 Security for One-to-One ProSe Direct Communication 6.5.1 General

The one-to-one ProSe Direct communication procedures are described in TS 23.303 [2]. One-to-one ProSe Direct Communication is used by two UEs that want to directly exchange traffic or when a remote UE attaches to a ProSe UE-to-network relay.

Security requirements are summarised in section 6.5.2. An overview of one-to-one ProSe Direct Communication is given in section 6.5.3. The authentication and key establishment procedures for the basic one-to-one communications are described in section 6.5.4. In section 6.5.5 the general security establishment that is used in all use cases is described.

The functionality in this clause may only be supported by ProSe-enabled Public Safety UEs.

6.5.2 Security Requirements

The following are the security requirements for ProSe Direct One-to-one Communication:

A ProSe-enabled UE shall use different security contexts for ProSe one-to-one communication with different ProSe-enabled UEs.

Direct link signalling ciphering shall be supported and may be used. Direct link signalling ciphering is a configuration option.

Direct link user plane ciphering shall be supported and may be used.

Direct link signalling integrity protection and replay protection shall be supported and used.

Direct link user plane packets between UEs shall not be integrity protected.

Establishment of the security between the UEs shall be protected from man-in-the-middle attacks.

The system should support mutual authentication of public safety UEs out of network coverage.

Compromise of a single UE should not affect the security of the others.

Authentication credentials should be securely stored in UE.

6.5.3 Overview of One-to-One ProSe Direct Communication 6.5.3.3 High Level Overview of Security Establishment

Figure 17:
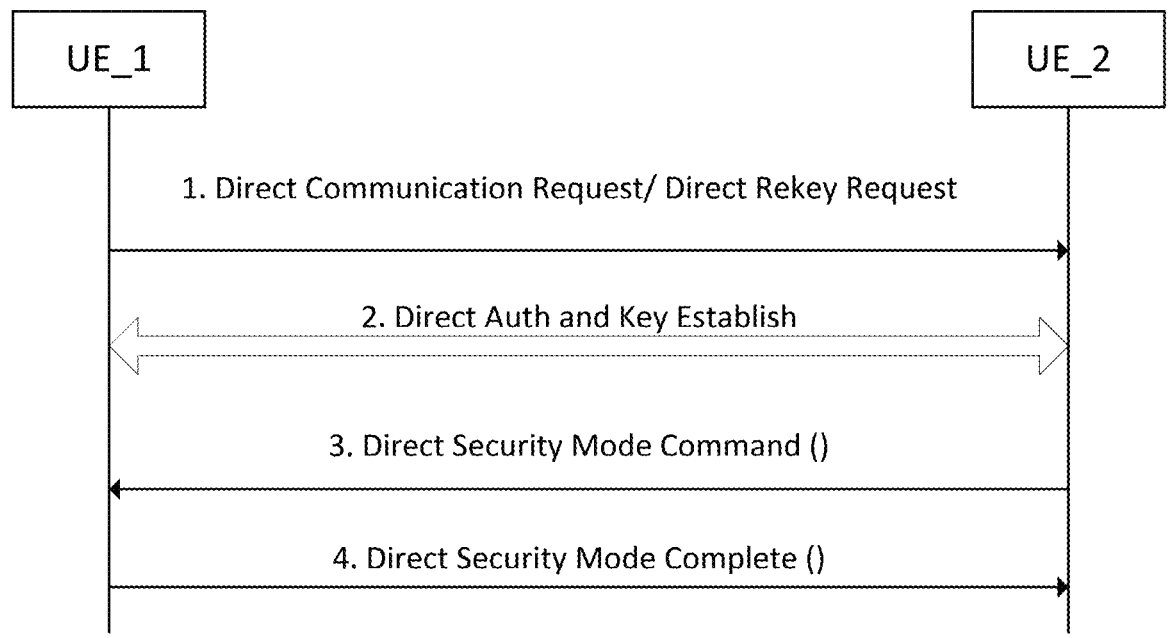
FIG. 17 is a reproduction of FIG. 6.5.3.3-1 of 3GPP TS 33.303 V15.0.0.

[FIG. 6.5.3.3-1 of 3GPP TS 33.303 V15.0.0, entitled "Overview of security establishment of ProSe Direct One-to-one communications", is reproduced as FIG. 17]

FIG. 6.5.3.3-1 provides a high level overview of security establishment. In this flow, authentication and key establishment happens during steps 1 to 3 with the requirement that UE_2 must know $K_D$ at the end of step 2. Step 2 may involve several messages, and these messages depend on the type of Long term key(s). More details on this are provided in subclause 6.5.4. The actual establishment of a security context happens during steps 1, 3 and 4.

More details on this are provided in subclause 6.5.5.

The integrity and confidentiality protection is applied at the PDCP layer. The details of this are given in subclause 6.5.6.

6.5.4 Direct Authentication and Key Establishment 6.5.4.1 General

There are various methods that ProSe Direct one-to-one communications may use to provide authentication and establishment of $K_D$. These methods may vary from case to case and the description of any necessary Direct Authentication and Key Establishment signalling that is needed in addition to the Direct Security Mode Command and Complete message will be covered with each specific case.

NOTE: None of the cases included in this release require any Direct Authentication and Key Establishment signalling.

6.5.5 Security Establishment Procedures 6.5.5.1 General

There are two different cases when a security context may be established; to set up a new connection and to re-key an ongoing connection. These cases are described in the following subclauses.

6.5.5.2 Security Establishment During Connection Set-Up

The subclause describes how security is established during connection set-up. The signalling flow is shown in FIG. 6.5.5.2-1.

Figure 18:
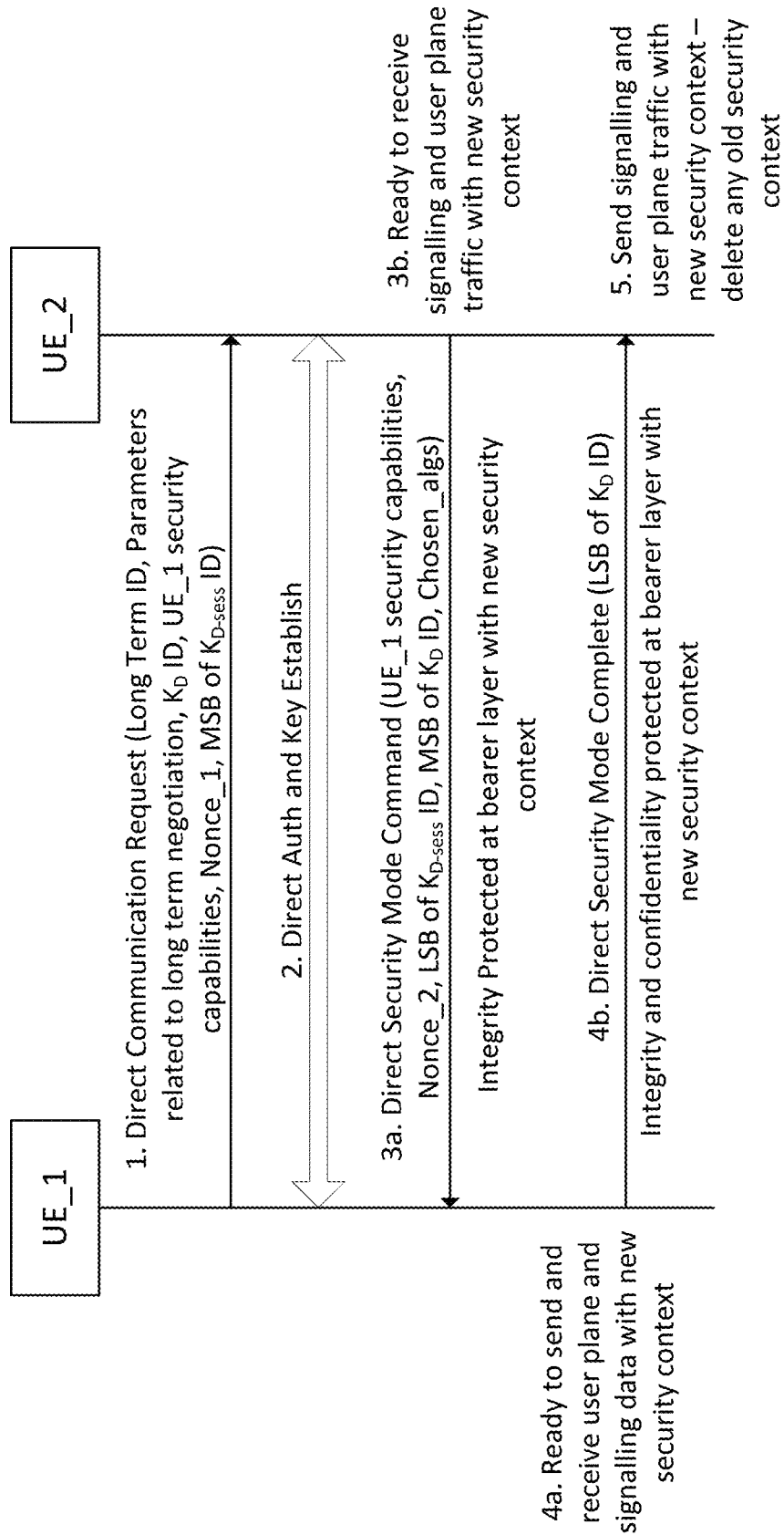
FIG. 18 is a reproduction of FIG. 6.5.5.2-1 of 3GPP TS 33.303 V15.0.0.

[FIG. 6.5.5.2-1 of 3GPP TS 33.303 V15.0.0, entitled "Security establishment at connection set-up", is reproduced as FIG. 18]

1. UE_1 has sent a Direct Communication Request to UE_2. This message shall include Nonce_1 (for session key generation), UE_1 security capabilities (the list of algorithms that UE_1 will accept for this connection) and the most significant 8-bits of the $K_{D\text{-}sess\ ID}$. These bits shall be chosen such that UE_1 will be able to locally identify a security context that is created by this procedure. The message may also include a $K_D$ ID if the UE_1 has an exisiting $K_D$ with the UE that it trying to communicate with. The absence of the $K_D$ ID parameter indicates that UE_1 does not have a $K_D$ for UE_2. The message shall also contain the necessary information to establish a $K_D$ from the revelvant long terms keys held on the UE (see subclause 6.X.4). Long term ID is the info needed by the UE_2 in order to retrieve the right Long term Key.

2. UE_2 may initiate a Direct Auth and Key Establish procedure with UE_1. This is mandatory if the UE_2 does not have the $K_D$ and $K_D$ ID pair indicated in step 1, and signalling is needed to establish the keys for the particular use case.

3. UE_2 sends the Direct Security Mode Command to UE_1. It shall include the most significant bits of $K_D$ ID if a fresh $K_D$ is generated, Nonce_2 to allow a session key to be calculated and the Chosen_algs parameter to indicate which security algorithms the UEs will use to protect the data. The included bits of $K_D$ ID shall uniquely identify the $K_D$ at UE_2. UE_2 shall also return the UE_1 security capabilities to provide protection against bidding down attacks. UE_2 also includes the least significant 8-bits of $K_{D\text{-}sess}$ ID in the messages. This bits are chosen so that UE_2 will be able to locally identify a security context that is created by this procedure. UE_2 calculates $K_{D\text{-}Sess}$ from $K_D$ and Nonce_1 and Nonce_2 (see Annex A.9) and then derives the confidentiality and integrity keys based on the chosen algorithms (Annex A.4).

UE_2 then integrity protects the Direct Security Mode Command before sending it to UE_1. UE_2 is then ready to receive both signalling and user plane traffic protected with the new security context. UE_2 shall form the $K_{D\text{-}sess}$ ID from the most significant bits it received in message 1 and least significant bits it sent in message 3.

4. On receieving the Direct Security Mode Command, UE_1 shall calculate $K_{D\text{-}sess}$ and the confidentiality and integrity keys in the same way as UE_2. UE_1 shall check that the returned UE_1 security capabilities are the same as those it sent in step 1. UE_1 shall also check the integrity protection on the message. If both these checks pass, then UE_1 is ready to send and receive signalling and user traffic with the new security context. If most significant bits of $K_D$ ID were included in the Direct Security Mode Command, UE_1 shall generate the least significant bits of $K_D$ ID such that these bits uniquely identify $K_D$ at UE_1 and shall store the complete $K_D$ ID with $K_D$. UE_1 shall send an integrity protected and confidentiality protected (with the chosen algorithm which may be the null algorithm) Direct Security Mode Complete message to UE_2. UE_1 shall include the least significant bits of $K_D$ ID in this message. UE_1 shall form the $K_{D\text{-}sess}$ ID from the most significant bits it sent in message 1 and least significant bits it received in message 3.

5. UE_2 checks the integrity protection on the received Direct Security Mode Complete. If this passes, UE_2 is now ready to send user plane data and control signalling protected with the new security context. UE_2 deletes any old security context it has for UE_1. UE_2 shall form the $K_D$ ID from the most significant bits it sent in step 3 and least significant bits it received in the Direct Security Mode Complete. UE_2 shall store the complete $K_D$ ID with $K_D$.

According 3GPP TR 23.786, UE-1 could perform a Layer-2 link establishment procedure with UE-2 if the UE-1 tends to communicate with the UE-2 via one-to-one sidelink communication. During the Layer-2 link establishment, the UE-1 could transmit a Direct Communication Request message to the UE-2. Possibly, the Direct Communication Request message could include:

An upper layer identity of the UE1;
An upper layer identity of the UE2;
A service identity for an V2X application;
An identity of a V2X application;
IP Address Config;
Security information;
Requested PC5 QoS parameters.

Upon reception of the Direct Communication Request message, the UE-2 could transmit a Direct Communication Accept message to the UE1. The Direct Communication Accept message could include:

Accepted PC5 QoS parameters.

As discussed in 3GPP TS 24.334, the content of the Direct Communication Request message was specified with the following items:

User Info;
IP Address Config;
Link Local IPv6 Address.

According to 3GPP TS 24.334, a target UE then checks an User Info IE included in a DIRECT_COMMUNICATION_REQUEST message upon reception of the DIRECT_COMMUNICATION_REQUEST message and determines whether this request can be accepted or not. Then, the target UE examines a IP Address Config IE included in the DIRECT_COMMUNICATION_REQUEST message to see whether there is at least one common IP address configuration option supported by both an initiating UE and the target UE. If the above check is successful, the target UE shall invoke a direct security mode control procedure to establish a security association between the target UE and the initiating UE. Only after the completion of link authentication procedure and a successful establishment of the security association, the target UE shall send a DIRECT_COMMUNICATION_ACCEPT message to the initiating UE.

Furthermore, the content of the Direct Communication Accept message was specified with following items:

IP Address Config.

If the target UE indicated "IPv6 Router" in the IP Address Config in the DIRECT_COMMUNICATION_ACCEPT message, then the initiating UE shall initiate IPv6 address configuration with IPv6 stateless address auto-configuration acting as an IPv6 host.

If the target UE indicated "address allocation not supported" in the IP Address Config and the initiating UE indicated it could be a DHCPv4 Server or a IPv6 Router in the IP Address Config, then the target UE shall initiate the IPv6 address configuration with IPv6 stateless address auto-configuration acting as an IPv6 host.

As discussed in 3GPP TS 33.303, a security establishment at connection setup for one-to-one sidelink communication was specified. Accordingly, the UE-1 wishing to engage in one-to-one sidelink Communication with the UE-2 sends a Direct Communication Request message including the following parameters:

User of UE-1 Info;
An ECCSI signature of the Direct Communication Request message.

Upon reception of the Direct Communication Request message, the UE-2 verifies the signature payload SIGN (the ECCSI signature). If the verification test is successful, the UE-2 presents the authenticated identity ("User of UE-1 Info") to the user of UE-2. If user of UE-2 decides to accept the request, UE-2 sends a Direct Security Mode Command message including the following parameters:

User of UE-2 Info;
An ECCSI signature of Direct Communication Response message (the Direct Security Mode Command message);
SAKKE.

Upon reception of the Direct Security Mode message, the UE-1 verifies the signature payload SIGN (the ECCSI signature of Direct Communication Response message). If the verification test is successful, it decrypts the SAKKE payload to extract the SSV which is used as a KD (root key) from which other keys can be derived. Upon successful processing of the Direct Security Mode Command message, the UE-1 responds with a Direct Security Mode Complete to the UE-2.

Figure 19:
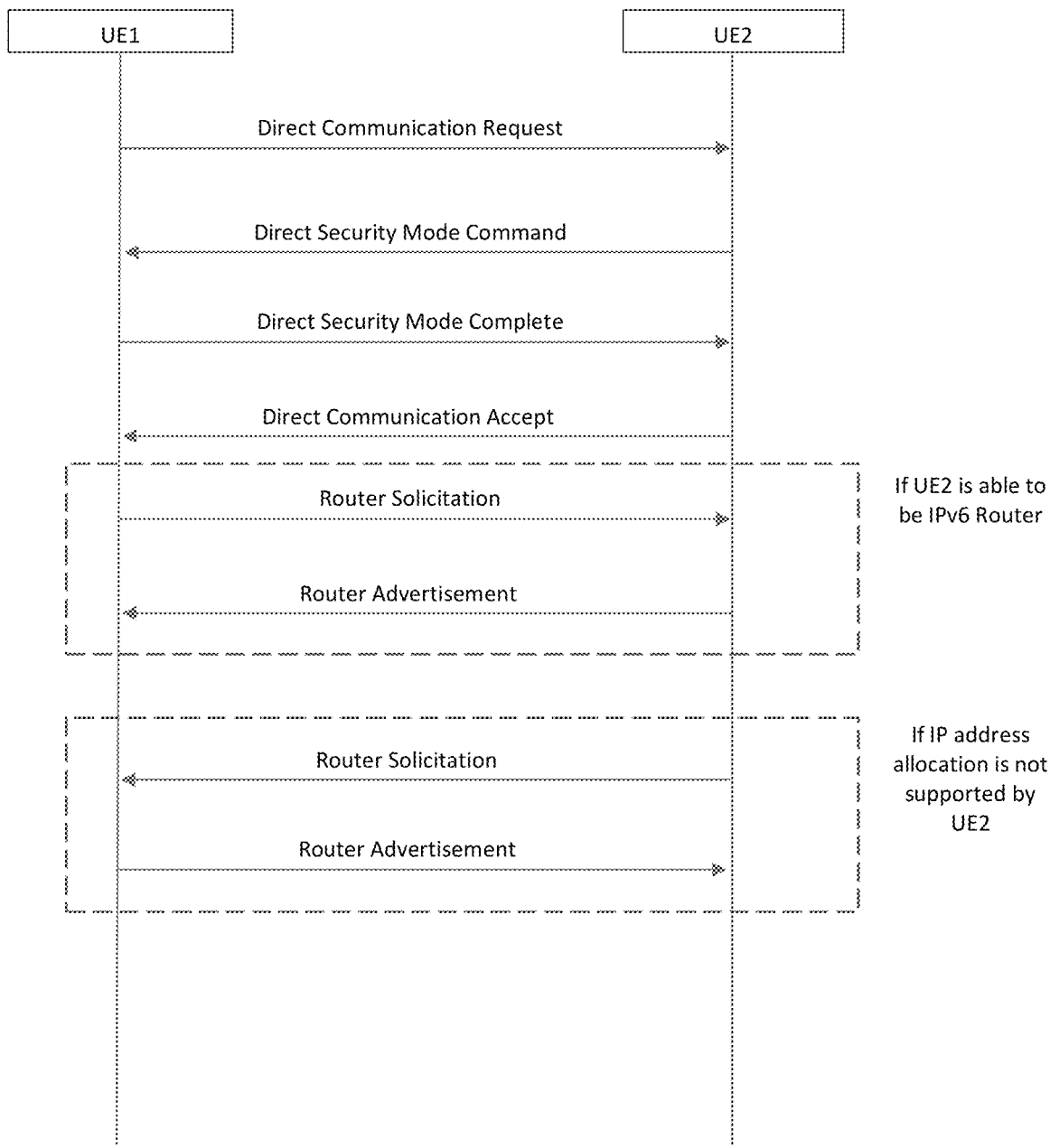
FIG. 19 is a diagram according to one exemplary embodiment.

Based on above introduction, an exemplary flow chart of a direct link establishment procedure for one-to-one sidelink communication could be illustrated in FIG. 19.

When a service (e.g. a very first V2X service) is initialized, the UE1 could perform a first sidelink transmission to the UE2. In the first sidelink transmission, a Direct Communication Request message could be included.

In the first sidelink transmission or the Direct Communication Request message, one or multiple information listed below could be included:
An upper layer identity of the UE1;
An upper layer identity of the UE2;
A service identity for an V2X application;
An identity of a V2X application;
IP Address Config (used to indicate if the UE1 could be a IPv6 Router);
Security information;
Requested PC5 QoS parameters;
User Info of the UE1;
Link Local IPv6 Address;
An ECCSI signature of the Direct Communication Request message.

Upon reception of the Direct Communication Request message, the UE2 could perform a second sidelink transmission to the UE1. In the second sidelink transmission, a Direct Security Mode Command message could be included.

In the second sidelink transmission or the Direct Security Mode Command message, one or multiple information listed below could be included:
User Info of the UE2;
An ECCSI signature of Direct Communication Response message (the Direct Security Mode Command message);
SAKKE.

Upon reception of the Direct Security Mode Command message, the UE1 could perform a third sidelink transmission to the UE2. In the third sidelink transmission, a Direct Security Mode Complete message could be included.

Upon reception of the Direct Security Mode Complete message, the UE2 could perform a fourth sidelink transmission to the UE1. In the fourth sidelink transmission, a Direct Communication Accept message could be included.

In the fourth sidelink transmission or the Direct Communication Accept message, one or multiple information listed below could be included:
Accepted PC5 QoS parameters;
IP Address Config (used to indicate if the UE2 could be an IPv6 Router).

If the UE2 could be an IPv6 Router, the UE1 could perform a fifth sidelink transmission to the UE2. In the fifth sidelink transmission, a Router Solicitation message (which could be a first IP configuration message used to request or ask an IP address (for the UE1)) could be included. Upon reception of the Router Solicitation message, the UE2 could perform a sixth sidelink transmission to the UE1. In the sixth sidelink transmission, a Router Advertisement message (which could be a second IP configuration message used to derive or configure the IP address (for the UE1)) could be included.

If the UE2 could be not an IPv6 Router, the UE2 could perform a fifth sidelink transmission to the UE1. In the fifth sidelink transmission, a Router Solicitation message (which could be a first IP configuration message used to request or ask an IP address (for the UE2)) could be included. Upon reception of the Router Solicitation message, the UE1 could perform a sixth sidelink transmission to the UE2. In the sixth sidelink transmission, a Router Advertisement message (which could be a second IP configuration message used to derive or configure the IP address (for the UE2)) could be included.

Figure 20:
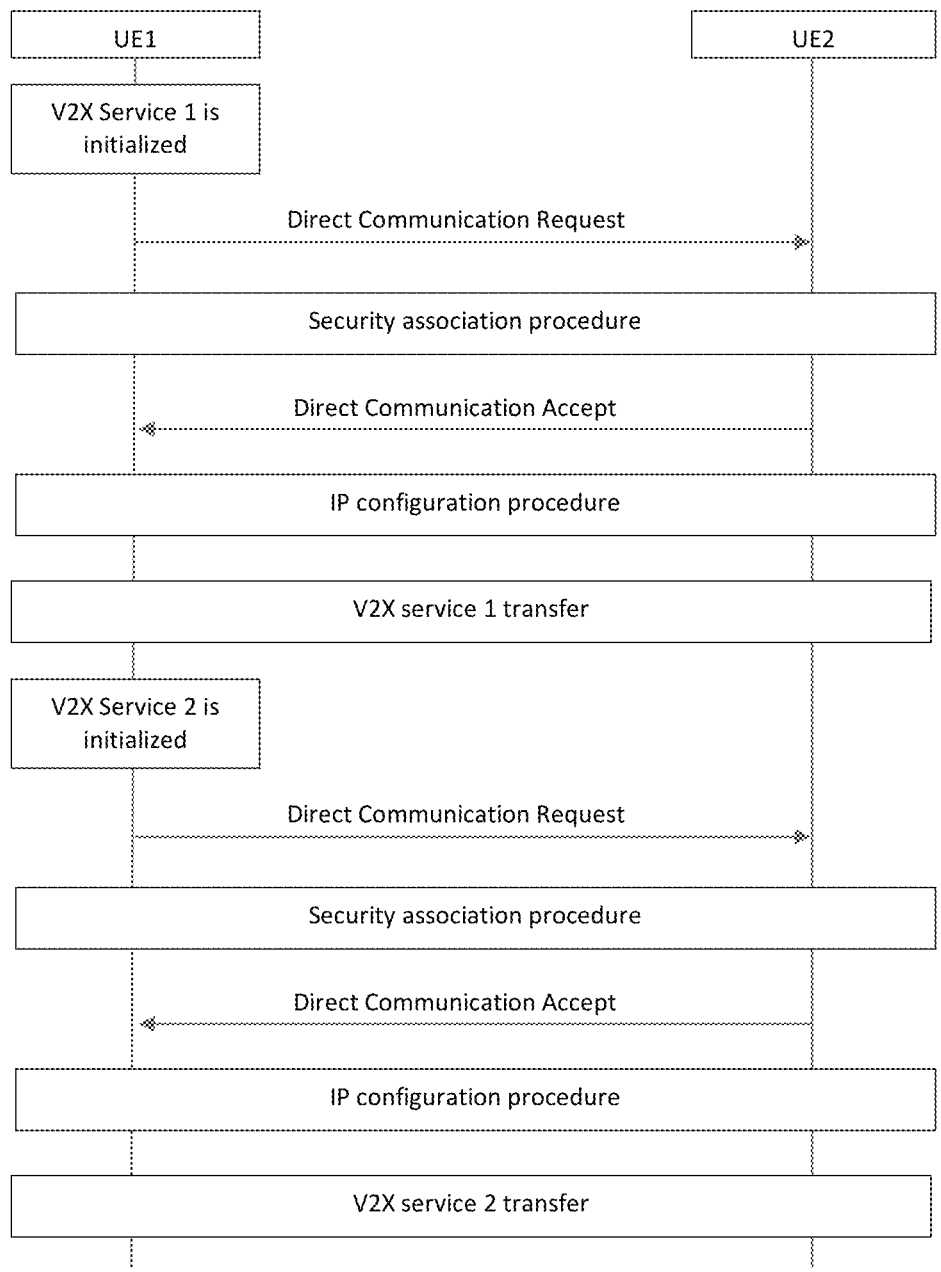
FIG. 20 is a diagram according to one exemplary embodiment.

According to 3GPP TR 23.786, PC5 QoS parameters could be included in a Direct Communication Request message during a link establishment procedure, which implies the one-to-one SL communication between two UEs can support only one V2X service. Since one-to-one SL communication between two UEs may be utilized for multiple V2X services simultaneously, the UEs will create multiple direct links if the UEs follow the link establishment procedure introduced in 3GPP TR 23.786, TS 24.334, and TS 33.303. For example, after a one-to-one SL communication link has been established between two UEs for a (very) first V2X service (e.g. a non-urgent V2X service), an urgent situation may occur. Thus, a second V2X service (e.g. an urgent V2X service) needs to be activated between these two UEs via another one-to-one SL communication link. As a result, this situation could cause signaling overhead that could be illustrated in exemplary FIG. 20.

During the direct link establishment procedure for the first V2X service, both the UE1 and the UE2 understand UE information/capability (e.g. User Info, PC5 QoS parameter, IP Address Config (used to indicate if the UE is able to be a IPv6 Router), UE Security Capabilities, etc.) about each other. Therefore, some methods to merge signaling into single sidelink transmission could be considered to reduce signaling overhead on a direct link establishment procedure for the following V2X services (e.g. the second V2X service).

I. Direction 1: Security Association Between the UE1 and the UE2 could be Per V2X Service.

In this direction, a first security association could be associated with the first V2X service. Furthermore, a second security association could be associated with the second V2X service.

Case 1: The UE2 is an IPv6 Router (According to IP Address Config Negotiated During Link Establishment Procedure for the First V2X Service)

Figure 21:
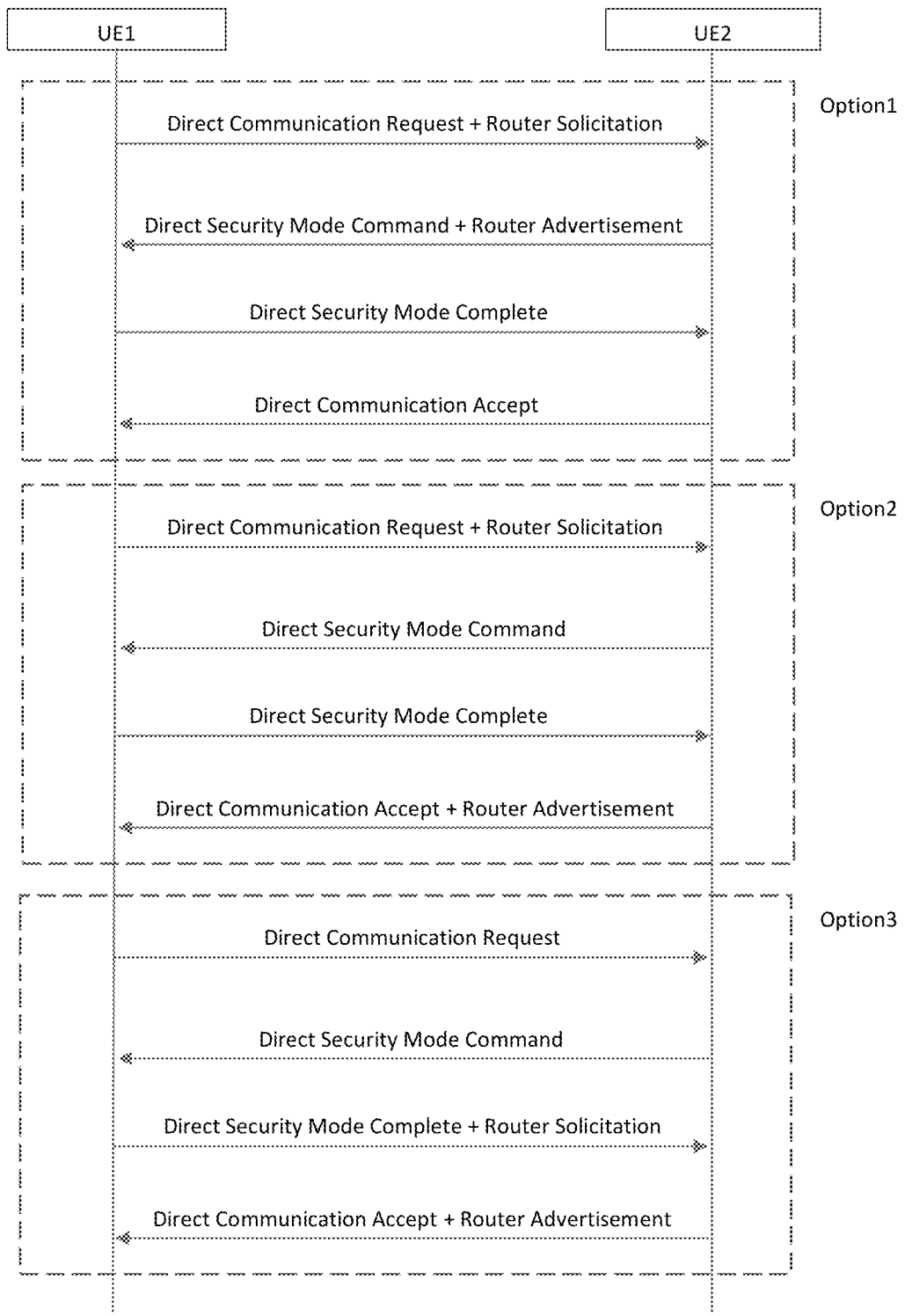
FIG. 21 is a diagram according to one exemplary embodiment.

Examples of flow chart could be illustrated in exemplary FIG. 21. When a service (e.g. the second V2X service) is initialized, the UE1 could perform a first sidelink transmission to the UE2.

Option 1 in FIG. 21—

In the first sidelink transmission, a Direct Communication Request message and a Router Solicitation message could be included. In the first sidelink transmission, one or multiple information listed below could be included (for the second V2X service):
An upper layer identity of the UE1;
An upper layer identity of the UE2;
A service identity for an V2X application;
An identity of a V2X application;
Security information;
Requested PC5 QoS parameters;
Link Local IPv6 Address;
An ECCSI signature of the Direct Communication Request message (and/or the Router Solicitation message);
A first IP configuration message used to request/ask an IP address (for the UE1).

Upon reception of the first sidelink transmission, the UE2 could perform a second sidelink transmission to the UE1. In the second sidelink transmission, a Direct Security Mode Command message and a Router Advertisement message could be included. In the second sidelink transmission, one or multiple information listed below could be included:
User Info of the UE2;
An ECCSI signature of Direct Communication Response message (the Direct Security Mode Command message and/or the Router Advertisement message);
SAKKE;
A second IP configuration message used to derive or configure the IP address (for the UE1).

Upon reception of the second sidelink transmission, the UE1 could perform a third sidelink transmission to the UE2. In the third sidelink transmission, a Direct Security Mode Complete message could be included.

Upon reception of the Direct Security Mode Complete message, the UE2 could perform a fourth sidelink transmission to the UE1. In the fourth sidelink transmission, a Direct Communication Accept message could be included. In the fourth sidelink transmission or the Direct Communication Accept message, one or multiple information listed below could be included:
Accepted PC5 QoS parameters.
Option 2 in FIG. 21—
In the first sidelink transmission, a Direct Communication Request message and a Router Solicitation message could be included. In the first sidelink transmission, one or multiple information listed below could be included (for the second V2X service):
An upper layer identity of the UE1;
An upper layer identity of the UE2;
A service identity for an V2X application;
An identity of a V2X application;
Security information;
Requested PC5 QoS parameters;
User Info of the UE1;
Link Local IPv6 Address;
An ECCSI signature of the Direct Communication Request message (and/or the Router Solicitation message);
A first IP configuration message used to request or ask an IP address (for the UE1).

Upon reception of the first sidelink transmission, the UE2 could perform a second sidelink transmission to the UE1. In the second sidelink transmission, a Direct Security Mode Command message could be included. In the second sidelink transmission, one or multiple information listed below could be included:
User Info of the UE2;
An ECCSI signature of Direct Communication Response message (the Direct Security Mode Command message);
SAKKE.

Upon reception of the second sidelink transmission, the UE1 could perform a third sidelink transmission to the UE2. In the third sidelink transmission, a Direct Security Mode Complete message could be included.

Upon reception of the Direct Security Mode Complete message, the UE2 could perform a fourth sidelink transmission to the UE1. In the fourth sidelink transmission, a Direct Communication Accept message and a Router Advertisement message could be included. In the fourth sidelink transmission, one or multiple information listed below could be included:
Accepted PC5 QoS parameters;
A second IP configuration message used to derive or configure the IP address (for the UE1).
Option 3 in FIG. 21—
In the first sidelink transmission, a Direct Communication Request message could be included. In the first sidelink transmission, one or multiple information listed below could be included (for the second V2X service):
An upper layer identity of the UE1;
An upper layer identity of the UE2;
A service identity for an V2X application;
An identity of a V2X application;
Security information;
Requested PC5 QoS parameters;
User Info of the UE1;
Link Local IPv6 Address;
An ECCSI signature of the Direct Communication Request message.

Upon reception of the first sidelink transmission, the UE2 could perform a second sidelink transmission to the UE1. In the second sidelink transmission, a Direct Security Mode Command message could be included. In the second sidelink transmission, one or multiple information listed below could be included:
User Info of the UE2;
An ECCSI signature of Direct Communication Response message (the Direct Security Mode Command message);
SAKKE.

Upon reception of the Direct Security Mode Command message, the UE1 could perform a third sidelink transmission to the UE2. In the third sidelink transmission, a Direct Security Mode Complete message and a Router Solicitation message could be included. In the third sidelink transmission, one or multiple information listed below could be included:
A first IP configuration message used to request or ask an IP address (for the UE1).

Upon reception of the third sidelink transmission, the UE2 could perform a fourth sidelink transmission to the UE1. In the fourth sidelink transmission, a Direct Communication Accept message and a Router Advertisement message could be included. In the fourth sidelink transmission, one or multiple information listed below could be included:
Accepted PC5 QoS parameters;
A second IP configuration message used to derive or configure the IP address (for the UE1).

After complete of above sidelink transmissions, the UE1 and UE2 could start V2X traffic transfer for the second V2X service via one-to-one sidelink communication.

Case 2: IP Address Allocation is not Supported by UE2 (According to IP Address Config Negotiated During Link Establishment Procedure for the First V2X Service)

Figure 22:
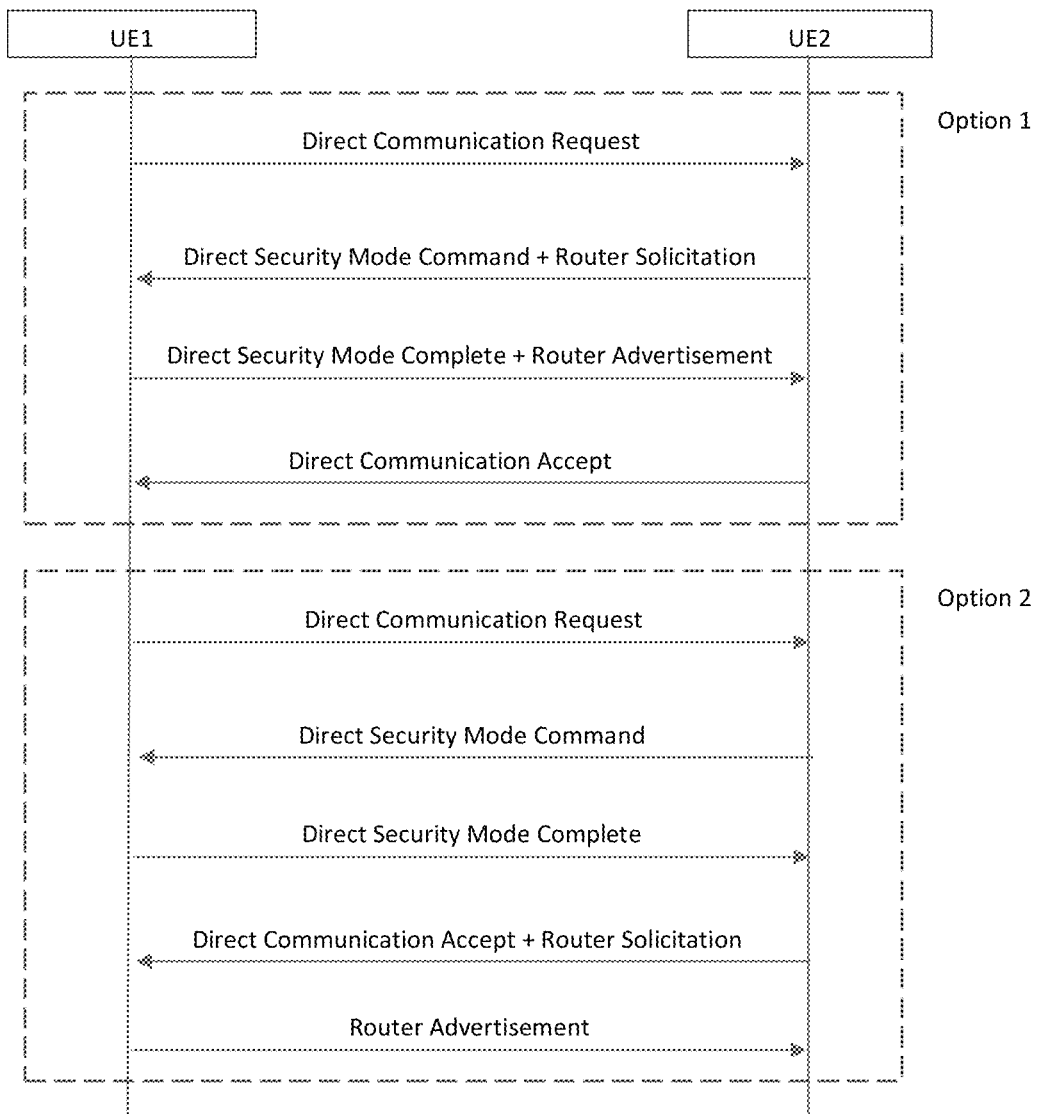
FIG. 22 is a diagram according to one exemplary embodiment.

Examples of flow chart could be illustrated in exemplary FIG. 22. When a service (e.g. the second V2X service) is initialized, the UE1 could perform a first sidelink transmission to the UE2.
Option 1 in FIG. 22—
In the first sidelink transmission, a Direct Communication Request message could be included. In the first sidelink transmission, one or multiple information listed below could be included (for the second V2X service):
An upper layer identity of the UE1;
An upper layer identity of the UE2;
A service identity for an V2X application;
An identity of a V2X application;
Security information;
Requested PC5 QoS parameters;
User Info of the UE1;
Link Local IPv6 Address;

An ECCSI signature of the Direct Communication Request message (and/or the Router Solicitation message).

Upon reception of the first sidelink transmission, the UE2 could perform a second sidelink transmission to the UE1. In the second sidelink transmission, a Direct Security Mode Command message and a Router Solicitation message could be included. In the second sidelink transmission, one or multiple information listed below could be included:

User Info of the UE2;
An ECCSI signature of Direct Communication Response message (the Direct Security Mode Command message and/or the Router Advertisement message);
SAKKE;
A first IP configuration message used to request or ask an IP address (for the UE2).

Upon reception of the second sidelink transmission, the UE1 could perform a third sidelink transmission to the UE2. In the third sidelink transmission, a Direct Security Mode Complete message and a Router Advertisement message could be included. In the third sidelink transmission, one or multiple information listed below could be included:

A second IP configuration message used to derive or configure the IP address (for the UE2).

Upon reception of the third sidelink transmission, the UE2 could perform a fourth sidelink transmission to the UE1. In the fourth sidelink transmission, a Direct Communication Accept message could be included. In the fourth sidelink transmission or the Direct Communication Accept message, one or multiple information listed below could be included:

Accepted PC5 QoS parameters.

Option 2 in FIG. 22—

In the first sidelink transmission, a Direct Communication Request message could be included. In the first sidelink transmission, one or multiple information listed below could be included (for the second V2X service):

An upper layer identity of the UE1;
An upper layer identity of the UE2;
A service identity for an V2X application;
An identity of a V2X application;
Security information;
Requested PC5 QoS parameters;
User Info of the UE1;
Link Local IPv6 Address;
An ECCSI signature of the Direct Communication Request message (and/or the Router Solicitation message).

Upon reception of the first sidelink transmission, the UE2 could perform a second sidelink transmission to the UE1. In the second sidelink transmission, a Direct Security Mode Command message could be included. In the second sidelink transmission, one or multiple information listed below could be included:

User Info of the UE2;
An ECCSI signature of Direct Communication Response message (the Direct Security Mode Command message);
SAKKE.

Upon reception of the second sidelink transmission, the UE1 could perform a third sidelink transmission to the UE2. In the third sidelink transmission, a Direct Security Mode Complete message could be included.

Upon reception of the Direct Security Mode Complete message, the UE2 could perform a fourth sidelink transmission to the UE1. In the fourth sidelink transmission, a Direct Communication Accept message and a Router Solicitation message could be included. In the fourth sidelink transmission, one or multiple information listed below could be included:

Accepted PC5 QoS parameters;
A first IP configuration message used to request or ask an IP address (for the UE2).

Upon reception of the fourth sidelink transmission, the UE1 could perform a fifth sidelink transmission to the UE2. In the fifth sidelink transmission, a Router Advertisement message could be included. In the fifth sidelink transmission, one or multiple information listed below could be included:

A second IP configuration message used to derive or configure the IP address (for the UE2).

After complete of above sidelink transmissions, the UE1 and UE2 could start V2X traffic transfer for the second V2X service via one-to-one sidelink communication.

II. Direction 2: Security Configuration Between the UE1 and the UE2 could be Per One-to-One Sidelink Communication.

In this direction, a common security configuration is shared by the first V2X service and the second V2X service. Furthermore, the further signaling used to negotiate security configuration (e.g. the Direct Security Mode Command and the Direct Security Mode Complete) for following V2X services (e.g. the second V2X service) may not be needed.

Case 1: The UE2 is an IPv6 Router (According to IP Address Config Negotiated During Link Establishment Procedure for the First V2X Service)

Figure 23:
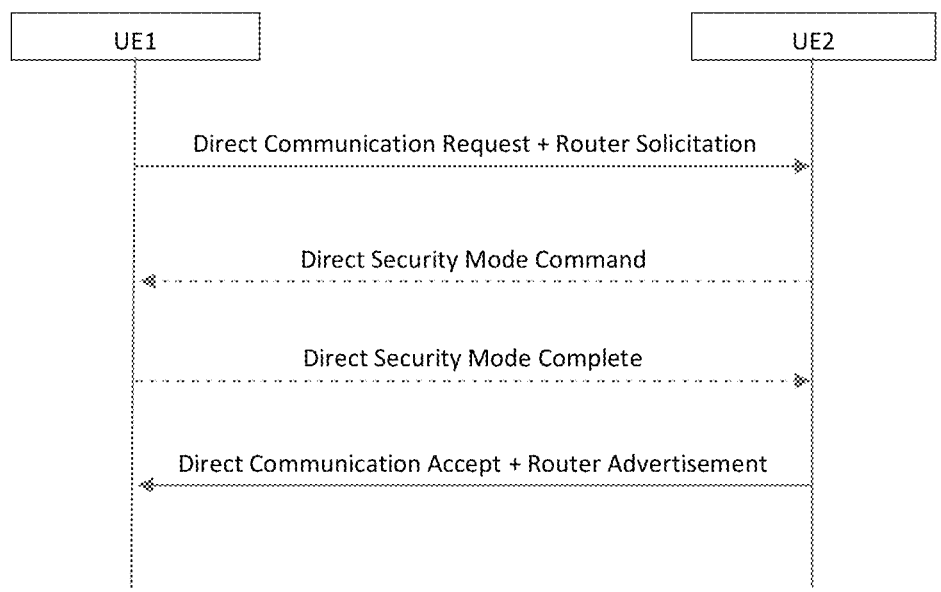
FIG. 23 is a diagram according to one exemplary embodiment.

An example of service flow chart could be illustrated in exemplary FIG. 23. When a service (e.g. the second V2X service) is initialized, the UE1 could perform a first sidelink transmission to the UE2.

In the first sidelink transmission, a Direct Communication Request message and a Router Solicitation message could be included. Given that the first V2X service and the second V2X service are supported by a one-to-one SL communication link and share the same security association, what absolutely required for the second V2X service initiation could be QoS negotiation between the UE1 and the UE2. Therefore, part of information elements included in the Direct Communication Request and/or the Direct Communication Accept may not be needed—e.g. User Info, UE Security Capabilities, IP Address Config (used to indicate if the UE is able to be a IPv6 Router), and/or etc. In the first sidelink transmission, one or multiple information listed below could be included (for the second V2X service):

An upper layer identity of the UE1;
An upper layer identity of the UE2;
A service identity for an V2X application;
An identity of a V2X application;
Requested PC5 QoS parameters;
Link Local IPv6 Address;
An ECCSI signature of the Direct Communication Request message (and/or the Router Solicitation message);
A first IP configuration message used to request or ask an IP address (for the UE1).

Upon reception of the first sidelink transmission, the UE2 could perform a second sidelink transmission to the UE1. In the second sidelink transmission, a Direct Communication Accept message and a Router Advertisement message could be included. In the second sidelink transmission, one or multiple information listed below could be included:

Accepted PC5 QoS parameters;
A second IP configuration message used to derive/configure the IP address (for the UE1).

After complete of above sidelink transmissions, the UE1 and UE2 could start V2X traffic transfer for the second V2X service via one-to-one sidelink communication.

Case 2: IP Address Allocation is not Supported by UE2 (According to IP Address Config Negotiated During Link Establishment Procedure for the First V2X Service)

Figure 24:
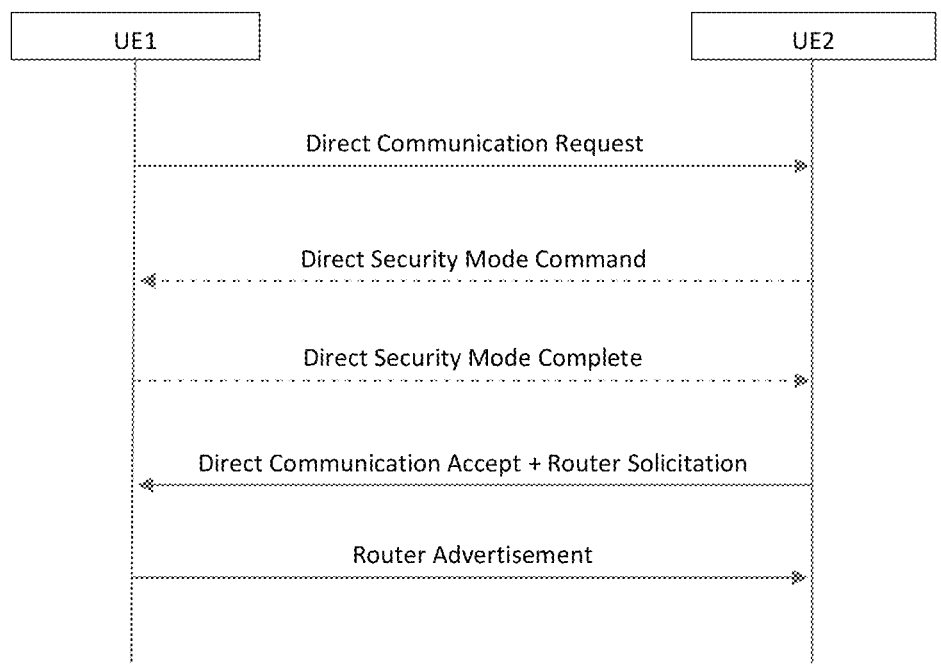
FIG. 24 is a diagram according to one exemplary embodiment.

An example of service flow chart could be illustrated in exemplary FIG. 24. When a service (e.g. the second V2X service) is initialized, the UE1 could perform a first sidelink transmission to the UE2.

In the first sidelink transmission, a Direct Communication Request message could be included. Given that the first V2X service and the second V2X service are supported by a one-to-one SL communication link and share the same security association, what absolutely required for the second V2X service initiation could be QoS negotiation between the UE1 and the UE2. Therefore, part of information elements included in the Direct Communication Request and/or the Direct Communication Accept may not be needed—e.g. User Info, UE Security Capabilities, IP Address Config (used to indicate if the UE is able to be a IPv6 Router), and/or etc. In the first sidelink transmission, one or multiple information listed below could be included (for the second V2X service):

An upper layer identity of the UE1;
An upper layer identity of the UE2;
A service identity for an V2X application;
An identity of a V2X application;
Requested PC5 QoS parameters;
Link Local IPv6 Address;
An ECCSI signature of the Direct Communication Request message (and/or the Router Solicitation message).

Upon reception of the first sidelink transmission, the UE2 could perform a second sidelink transmission to the UE1. In the second sidelink transmission, a Direct Communication Accept message and a Router Solicitation message could be included. In the second sidelink transmission, one or multiple information listed below could be included:

Accepted PC5 QoS parameters;
A first IP configuration message used to request/ask a IP address (for the UE2).

Upon reception of the second sidelink transmission, the UE1 could perform a third sidelink transmission to the UE2. In the third sidelink transmission, a Router Advertisement message could be included. In the third sidelink transmission, one or multiple information listed below could be included:

A second IP configuration message used to derive/configure the IP address (for the UE2).

After complete of above sidelink transmissions, the UE1 and UE2 could start V2X traffic transfer for the second V2X service via one-to-one sidelink communication.

Regardless of any methods or inventions discussed above, the connection for one-to-one sidelink communication could be an AS level link between devices (or vehicles). In one embodiment, the connection for one-to-one sidelink communication could be a RRC connection between devices (or vehicles). Regardless of any methods or inventions discussed above, the UE could be a vehicle.

Figure 25:
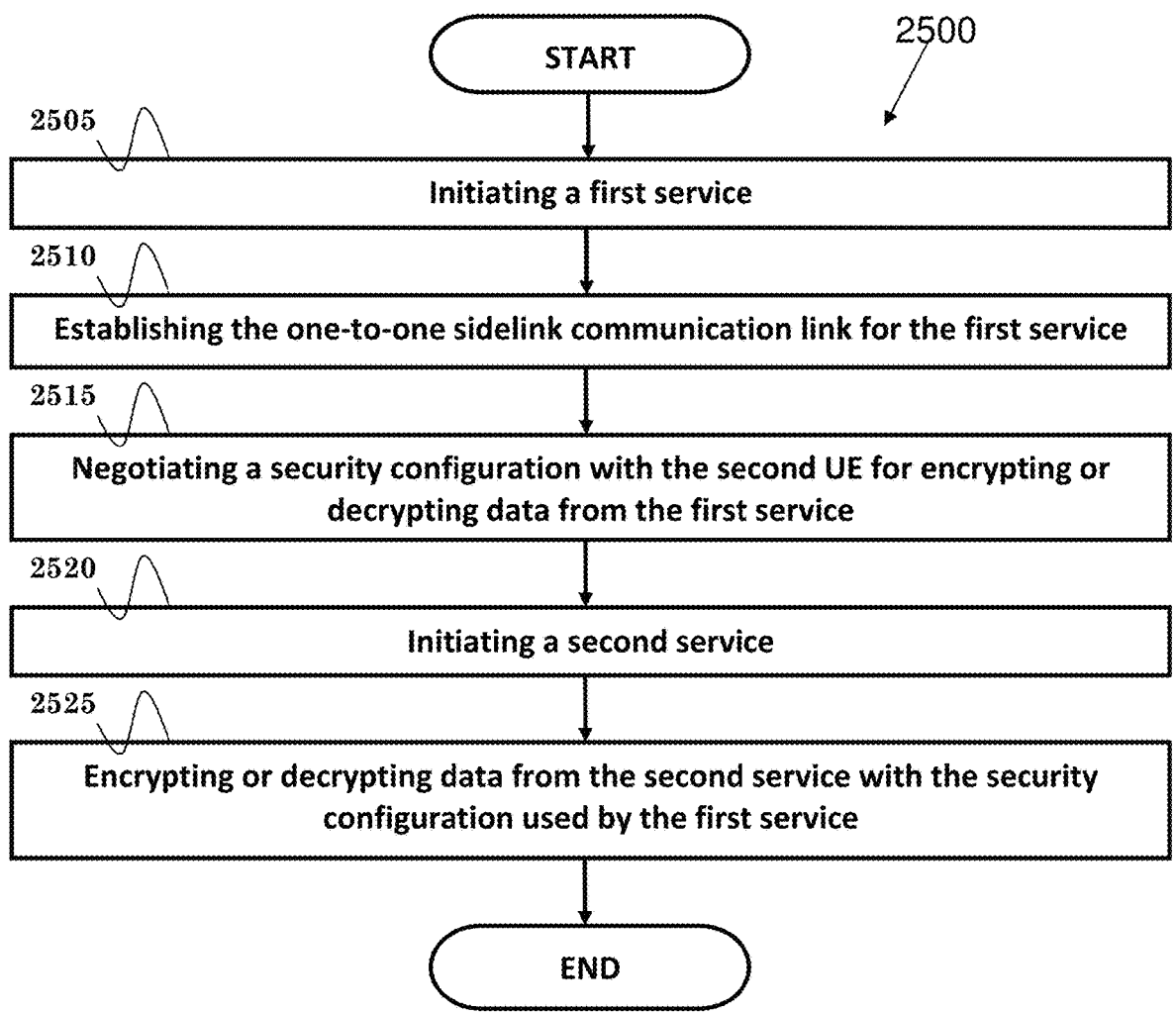
FIG. 25 is a flow chart according to one exemplary embodiment.

FIG. 25 is a flow chart 2500 according to one exemplary embodiment from the perspective of a first UE for supporting multiple services on a one-to-one sidelink communication link between the first UE and a second UE. In step 2505, the first UE initiates a first service. In step 2510, the first UE establishes the one-to-one sidelink communication link for the first service. In step 2515, the first UE negotiates a security configuration with the second UE for encrypting or decrypting data from the first service. In step 2520, the first UE initiates a second service. In step 2525, the first UE encrypts or decrypts data from the second service with the security configuration used by the first service.

In one embodiment, the first UE may negotiate the security configuration with the second UE during establishing the one-to-one sidelink communication link with the second UE. The security configuration may include at least a security key.

In one embodiment, the first UE may create at least one first sidelink traffic channel (STCH) or sidelink radio bearer (SLRB) for the first service. The first UE may also create at least one second STCH or SLRB for the second service.

In one embodiment, the first UE may map data from a first QoS flow or traffic flow of the first service to one of the at least one first STCH or SLRB for transmission according to a first mapping information configured by a network node. The first UE may also map data from a second QoS flow or traffic flow of the second service to one of the at least one first STCH (or SLRB) or one of the at least one second STCH (or SLRB) for transmission according to a second mapping information configured by a network node. The network node could be a base station e.g. gNB.

Referring back to FIGS. 3 and 4, in one exemplary embodiment of a first UE for supporting multiple services on a one-to-one sidelink communication link between the first UE and a second UE, the device 300 includes a program code 312 stored in the memory 310. The CPU 308 could execute program code 312 to enable the first UE (i) to initiate a first service, (ii) to establish the one-to-one sidelink communication link for the first service, (iii) to negotiate a security configuration with the second UE for encrypting or decrypting data from the first service, (iv) to initiate a second service, and (v) to encrypt or decrypt data from the second service with the security configuration used by the first service. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE) to support multiple services on a one-to-one sidelink communication link, comprising:
    performing a discovery procedure to find a second UE;
    initiating a first service;
    establishing the one-to-one sidelink communication link with the second UE for the first service;
    negotiating a security configuration with the second UE for encrypting or decrypting data from the first service;
    initiating a second service; and
    encrypting or decrypting data from the second service with the security configuration used by the first service.

2. The method of claim 1, wherein the first UE negotiates the security configuration with the second UE during establishing the one-to-one sidelink communication link with the second UE.

3. The method of claim 1, wherein the security configuration includes at least a security key.

4. The method of claim 1, further comprising:
    creating at least one first sidelink traffic channel (STCH) or sidelink radio bearer (SLRB) for the first service.

5. The method of claim 1, further comprising:
    creating at least one second STCH or SLRB for the second service.

6. The method of claim 1, further comprising:
    mapping data from a first quality of service (QoS) flow or traffic flow of the first service to one of at least one first STCH or SLRB for transmission according to a first mapping information configured by a network node.

7. The method of claim 1, further comprising:
    mapping data from a second QoS flow or traffic flow of the second service to one of at least one first STCH or SLRB, or one of the at least one second STCH or SLRB, for transmission according to a second mapping information configured by a network node.

8. A first User Equipment (UE) to establish a one-to-one sidelink communication link, comprising:
    a processor; and
    a memory operatively coupled to the processor, wherein the processor is configured to execute a program code to:
        perform a discovery procedure to find a second UE;
        initiate a first service;
        establishing the one-to-one sidelink communication link with the second UE for the first service;

negotiate a security configuration with the second UE for encrypting or decrypting data from the first service;

initiate a second service; and encrypt or decrypt data from the second service with the security configuration used by the first service.

9. The first UE of claim 8, wherein the processor is further configured to execute a program code to:

negotiate the security configuration with the second UE during establishing the one-to-one sidelink communication link with the second UE.

10. The first UE of claim 8, wherein the security configuration includes at least a security key.

11. The first UE of claim 8, wherein the processor is further configured to execute a program code to:

create at least one first sidelink traffic channel (STCH) or sidelink radio bearer (SLRB) for the first service.

12. The first UE of claim 8, wherein the processor is further configured to execute a program code to:

create at least one second STCH or SLRB for the second service.

13. The first UE of claim 8, wherein the processor is further configured to execute a program code to:

map data from a first quality of service (QoS) flow or traffic flow of the first service to one of at least one first STCH or SLRB for transmission according to a first mapping information configured by a network node.

14. The first UE of claim 8, wherein the processor is further configured to execute a program code to:

map data from a second QoS flow or traffic flow of the second service to one of at least one first STCH or SLRB, or one of the at least one second STCH or SLRB, for transmission according to a second mapping information configured by a network node.

15. A method for a first User Equipment (UE) to support multiple services on a one-to-one sidelink communication link, comprising:

performing a discovery procedure to find a second UE;

initiating a first service;

establishing the one-to-one sidelink communication link with the second UE for the first service;

negotiating a security configuration with the second UE for encrypting or decrypting data from the first service, wherein at least one first sidelink traffic channel (STCH) or sidelink radio bearer (SLRB) is created for the first service;

initiating a second service, wherein at least one second STCH or SLRB is created for the second service; and encrypting or decrypting data from the second service with the security configuration used by the first service.

16. The method of claim 15, wherein the first UE negotiates the security configuration with the second UE during establishing the one-to-one sidelink communication link with the second UE.

17. The method of claim 15, wherein the security configuration includes at least a security key.

18. The method of claim 15, further comprising:

mapping data from a first quality of service (QoS) flow or traffic flow of the first service to one of the at least one first STCH or SLRB for transmission according to a first mapping information configured by a network node.

19. The method of claim 15, further comprising:

mapping data from a second QoS flow or traffic flow of the second service to one of the at least one first STCH or SLRB, or one of the at least one second STCH or SLRB, for transmission according to a second mapping information configured by a network node.

* * * * *